(12) United States Patent
Maki et al.

(10) Patent No.: US 12,625,105 B2
(45) Date of Patent: May 12, 2026

(54) GAS SENSOR

(71) Applicant: NGK INSULATORS, LTD., Nagoya (JP)

(72) Inventors: Shintaro Maki, Nagoya (JP); Kota Katagiri, Nagoya (JP); Kohei Yaita, Nagoya (JP); Yuya Seike, Nagoya (JP); Satoru Shiraishi, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 315 days.

(21) Appl. No.: 18/414,648

(22) Filed: Jan. 17, 2024

(65) Prior Publication Data

US 2024/0280532 A1      Aug. 22, 2024

(30) Foreign Application Priority Data

Feb. 20, 2023      (JP) ................................. 2023-024161

(51) Int. Cl.
G01N 27/406          (2006.01)
G01N 27/407          (2006.01)

(52) U.S. Cl.
CPC ..... G01N 27/4062 (2013.01); G01N 27/4078 (2013.01)

(58) Field of Classification Search
CPC ........... G01N 27/4062; G01N 27/4078; G01N 27/4162; G01N 27/00
See application file for complete search history.

(56) References Cited

U.S. PATENT DOCUMENTS

| | | | |
|---|---|---|---|
| 4,983,271 A | 1/1991 | Kato et al. | |
| 2004/0182705 A1* | 9/2004 | Ishikawa ............. | G01N 33/005 |
| | | | 204/426 |
| 2010/0139379 A1* | 6/2010 | Kume ............... | G01N 27/4062 |
| | | | 73/114.73 |

FOREIGN PATENT DOCUMENTS

| | | | | | |
|---|---|---|---|---|---|
| CN | 105745533 A | * | 7/2016 | ........ | G01N 27/4071 |
| DE | 10312106 A1 | * | 10/2004 | ............. | G01K 7/18 |
| JP | 02-146365 U | | 12/1990 | | |
| JP | 2021047029 A | * | 3/2021 | ........ | G01N 27/4062 |
| WO | WO-2020066051 A1 | * | 4/2020 | .......... | G01N 27/407 |
| WO | WO-2020213323 A1 | * | 10/2020 | ........ | G01N 27/4078 |
| WO | WO-2022074867 A1 | * | 4/2022 | .......... | G01N 27/407 |

* cited by examiner

*Primary Examiner* — Thomas M Hammond, III

(74) *Attorney, Agent, or Firm* — MATTINGLY & MALUR, PC

(57)      ABSTRACT

Provided is a gas sensor that reduces a possibility that a terminal fitting electrically connecting a sensor element and a lead wire to each other breaks due to vibrations applied to the gas sensor. In the gas sensor according to one aspect of the present invention, a value obtained by dividing a second distance db, which is a distance from a start end that is an end of a reduced diameter portion of a tubular body on a frontmost end side to a positioning fixture of the terminal fitting, by a first distance Da, which is a distance from the start end to a protrusion of the tubular body, is 0.24 or more and 0.39 or less.

6 Claims, 5 Drawing Sheets

FIG. 5

GAS SENSOR

CROSS-REFERENCE TO RELATED APPLICATION

The present application claims priority from Japanese application JP 2023-024161, filed on Feb. 20, 2023, the contents of which is hereby incorporated by reference into this application.

FIELD OF INVENTION

The present invention relates to a gas sensor.

BACKGROUND

Conventionally, a gas sensor that detects a concentration of a specific gas such as oxygen and NOx in a gas to be measured such as an exhaust gas of an automobile is known. For example, JP H02-146365 U discloses a gas sensor that includes a tubular body, an elastic body, a lead wire, and a terminal fitting. The tubular body houses a sensor element. The elastic body seals an opening of the tubular body. The lead wire is inserted into the elastic body. The terminal fitting electrically connects the sensor element and the lead wire to each other. In the gas sensor disclosed in JP H02-146365 U, the elastic body into which the lead wire is inserted is caulked and fixed by the tubular body to seal the tubular body.

SUMMARY OF INVENTION

The inventors of the present invention have found a problem that when a conventional gas sensor as disclosed in JP H02-146365 U is repeatedly used in an environment where vibrations are applied to the gas sensor, there is a higher possibility that the terminal fitting electrically connecting the sensor element and the lead wire to each other breaks. The inventors of the present invention have conducted studies on the problem, and have identified the following phenomenon as causes of the higher possibility that the terminal fitting breaks by the vibrations applied to the gas sensor.

FIG. 4 is a schematic cross-sectional view schematically illustrating a configuration example of a conventional gas sensor. That is, FIG. 4 schematically illustrates a configuration of a cross section of a conventional gas sensor. The cross section is parallel to and in contact with a longitudinal axis (axis line, a line along the left-right direction in the drawing) of the conventional gas sensor. As illustrated in FIG. 4, the conventional gas sensor has an axis and is formed to extend along a longitudinal direction (axial direction). The conventional gas sensor has a front end and a rear end as respective ends in the longitudinal direction. One end in the longitudinal direction is the front end, and the other end is the rear end. In the example in FIG. 4, the conventional gas sensor is disposed such that the front end faces left, and the rear end faces right. That is, the left-right direction in FIG. 4 corresponds to the longitudinal direction (axial direction).

The conventional gas sensor illustrated in FIG. 4 includes a tubular body 20, an elastic body 50, lead wires 40, and terminal fittings 30. The tubular body 20 houses a sensor element 10. The elastic body 50 seals an opening of the tubular body 20 on a rear end side. The lead wires 40 are inserted into the elastic body 50. The terminal fittings 30 electrically connect the sensor element 10 and the lead wires 40 to each other.

The terminal fitting 30 includes an element contact portion 31 on a front end side and a lead wire holder 32 on the rear end side. The element contact portion 31 is electrically connected to an element electrode of the sensor element 10. The lead wire holder 32 crimps and holds the lead wire 40. The terminal fitting 30 further includes a positioning fixture 33. The positioning fixture 33 is locked to a ceramic housing 60 to fix the position of the terminal fitting 30 with respect to the ceramic housing 60. That is, the positioning fixture 33 is locked to the ceramic housing 60, so that the position of the terminal fitting 30 is fixed with respect to the ceramic housing 60.

The tubular body 20 includes a cylindrical metallic shell 21A, a cylindrical inner tube 21B, a cylindrical outer tube 22, and a fixing bolt 23, all of which are formed of a metal member. The metallic shell 21A and the inner tube 21B may be integrally formed, and both may be collectively referred to as a "metallic shell 21". The sensor element 10, the terminal fittings 30, and the ceramic housing 60 are disposed inside the tubular body 20. The tubular body 20 (metallic shell 21) further includes a protrusion 222 on the front end side. The protrusion 222 is in contact with an external member (for example, an exhaust pipe of an automobile) to which the conventional gas sensor is to be attached, and prevents leakage of a gas to be measured from a space defined by the external member. Furthermore, a reduced diameter portion 221 is formed in the tubular body 20 (outer tube 22) on the rear end side. The reduced diameter portion 221 caulks a "portion of the elastic body 50 that accommodates the lead wires 40 therein and extends in the axial direction" from the periphery. In the example illustrated in FIG. 4, a reduced diameter portion 221(1) and a reduced diameter portion 221(2) are formed.

In FIG. 4, "Da" represents a first distance Da that is a distance in the axial direction from a start end 2211 that is an end of the reduced diameter portion 221 of the tubular body 20 on a frontmost end side to the protrusion 222 of the tubular body 20. In the example illustrated in FIG. 4, the first distance Da is a distance in the axial direction from the start end 2211 to a surface of the protrusion 222 (an end face of the protrusion 222 on the front end side) that is in contact with an external member to which the conventional gas sensor is to be attached.

As described above, a plurality of reduced diameter portions 221 are formed in the tubular body 20 illustrated in FIG. 4. Specifically, the reduced diameter portion 221(1) and the reduced diameter portion 221(2) are formed. In a case where a plurality of reduced diameter portions 221 are formed in the tubular body 20, the start end 2211 is an "end on the frontmost end side" of the reduced diameter portion 221 on the frontmost end side out of the plurality of reduced diameter portions 221 formed in the tubular body 20. In the example illustrated in FIG. 4, the start end 2211 is an "end on the frontmost end side" of the reduced diameter portion 221(1), which is the reduced diameter portion 221 on the frontmost end side out of the plurality of reduced diameter portions 221. Therefore, in FIG. 4, "Da" represents the first distance Da that is a distance in the axial direction from the start end 2211 of the reduced diameter portion 221(1) to the protrusion 222 of the tubular body 20. Particularly, in the example illustrated in FIG. 4, the first distance Da is a distance in the axial direction from the start end 2211 of the reduced diameter portion 221(1) to the end face (front end face) of the protrusion 222 on the front end side.

In FIG. 4, "db" represents a second distance db that is a distance in the axial direction from the start end 2211 of the reduced diameter portion 221 to the positioning fixture 33 of the terminal fitting 30. As described above, in a case where a plurality of reduced diameter portions 221 are formed in the tubular body 20, the start end 2211 is the "end on the frontmost end side" of the reduced diameter portion 221 on the frontmost end side out of the plurality of reduced diameter portions 221 formed in the tubular body 20. Therefore, in FIG. 4, "db" represents the second distance db that is a distance in the axial direction from the start end 2211 of the reduced diameter portion 221(1) to the positioning fixture 33 of the terminal fitting 30.

The conventional gas sensor is used, for example, in a mode in which the front end side thereof is exposed to the inside of the exhaust pipe and in a state in which the front end side is fixed to the exhaust pipe. In such a state, vibrations of the exhaust pipe are transmitted from the protrusion 222 of the tubular body 20 or the like. In other words, vibrations are applied to the conventional gas sensor. That is, vibrations are transmitted from an external member to the gas sensor in contact with the external member (for example, an exhaust pipe) at the protrusion 222 (particularly, the front end face of the protrusion 222) via the protrusion 222. At this time, the phase of the shake of surface members (outer members) of the gas sensor extending in the axial direction does not necessarily coincide with the phase of the shake of inner members of the gas sensor (members housed inside the gas sensor). For example, (1) the phase of the shake of the surface members such as the tubular body 20 does not necessarily coincide with (2) the phase of the shake of the inner members such as the sensor element 10 extending in the axial direction and the terminal fittings 30, which are electrically connected to the sensor element 10 and the positions of which are fixed inside the ceramic housing 60. Note that the shake in parallel to the longitudinal direction (axial direction) of the gas sensor is ignored.

In addition, the inventors of the present invention have found that in a case where the phase of the shake of the tubular body 20 and the like and the phase of the shake of the sensor element 10 (and the terminal fittings 30) do not coincide with each other, a load is applied to the terminal fittings 30, so that there is a higher possibility that the terminal fittings 30 break due to such a load. That is, the inventors of the present invention have found that breakage of the terminal fittings 30 is influenced by metal fatigue caused by vibrations applied to the gas sensor (vibrations repeatedly applied to the gas sensor). As a portion of the terminal fitting 30 prone to experience metal fatigue, for example, the positioning fixture 33 is considered. The positioning fixture 33 is locked to the ceramic housing 60 to fix the position of the terminal fitting 30 with respect to the ceramic housing 60.

Here, the longer the first distance Da, the greater the shake of the surface members of the gas sensor such as the tubular body 20, and the higher the possibility that a portion, of the terminal fitting 30 as a metal component, located between the start end 2211 of the reduced diameter portion 221 and the positioning fixture 33 of the terminal fitting 30 breaks due to the influence of this shake.

In recent years, gas sensors have been increasingly required to have a longer life. In order to prolong the life of a gas sensor, it is necessary to prolong the life of the components, such as the terminal fitting 30, included in the gas sensor. However, for example, in a case where the gas sensor is attached to an exhaust pipe or the like of an automobile traveling on a rough road, vibrations applied to the gas sensor become intense, and there is a higher possibility that the terminal fitting 30 breaks for the reason described above.

Figure 5:
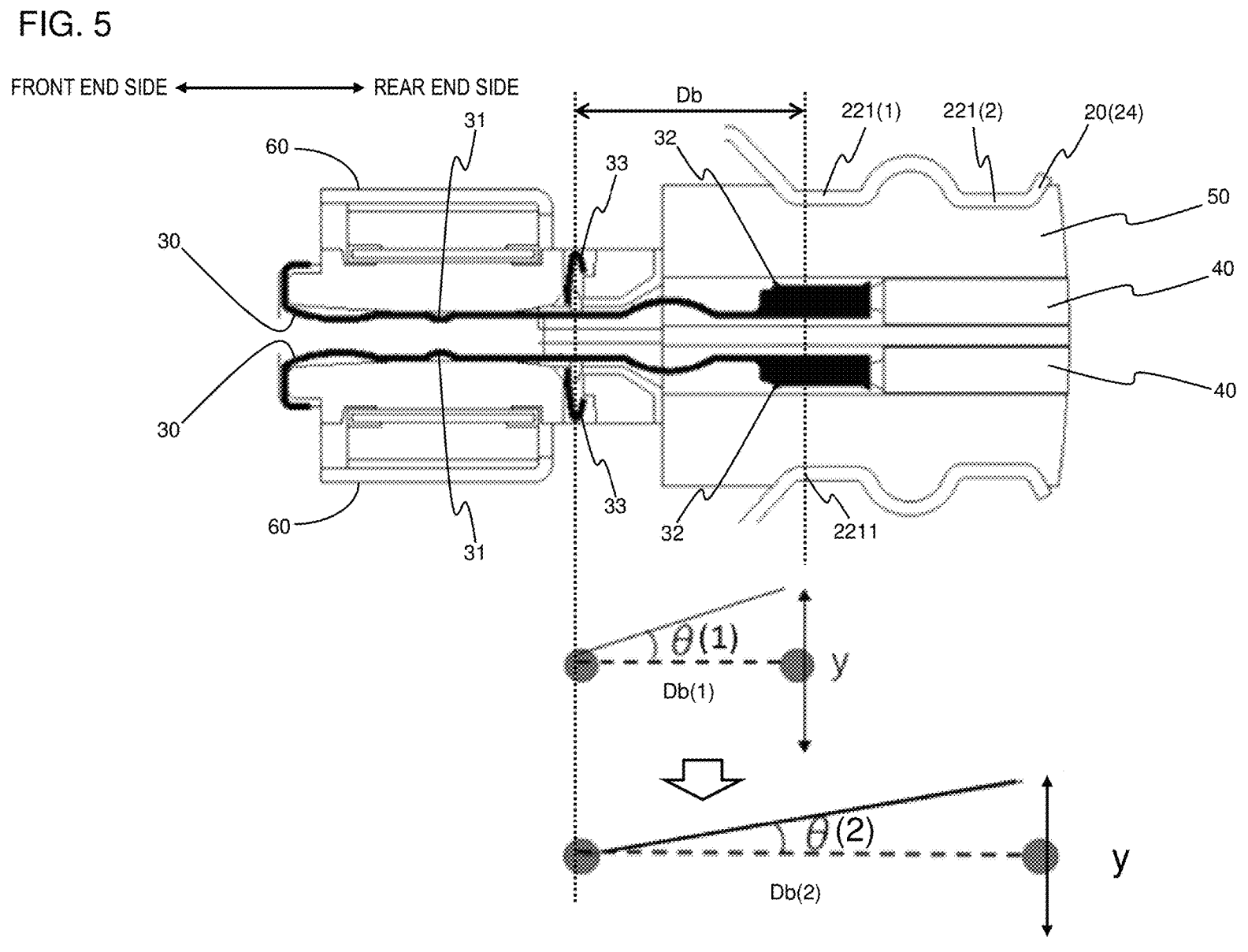

FIG. 5 is a diagram for describing a relationship between a magnitude of a load applied to the terminal fitting 30 when vibrations are applied to the gas sensor and the second distance db. Specifically, FIG. 5 is an enlarged cross section illustrating a cross section of the conventional gas sensor on the rear end side illustrated in FIG. 4, in an enlarged manner. FIG. 5 also illustrates a relationship between the dimension of the second distance db and the angle of the shake of the terminal fitting 30. In the enlarged cross-sectional view of the conventional gas sensor on the rear end side illustrated in the upper part of FIG. 5, the left-right direction of the paper surface is the axial direction (longitudinal direction) of the conventional gas sensor (sensor element 10). The left side of the paper surface is the front end side, and the right side of the paper surface is the rear end side.

As has been described with reference to FIG. 4, in the conventional gas sensor, the position of the terminal fitting 30 inside the gas sensor (that is, inside the tubular body 20) is fixed by the ceramic housing 60 and the reduced diameter portion 221 of the tubular body 20. Specifically, the positioning fixture 33 is locked to the ceramic housing 60, so that the terminal fitting 30 is fixed to the ceramic housing 60. In addition, the lead wire holder 32 of the terminal fitting 30 crimps and holds the lead wire 40, that is, the terminal fitting 30 is fixed to the lead wire 40. Furthermore, the reduced diameter portion 221 of the tubular body 20 caulks the periphery of the "portion of the elastic body 50 that accommodates the lead wires 40 therein and extends in the axial direction", so that the lead wires 40 are fixed. Therefore, the reduced diameter portion 221 of the tubular body 20 fixes the lead wires 40 and the terminal fittings 30 that crimp and hold the lead wires 40.

Here, the longer the first distance Da, the greater the shake of the surface members of the gas sensor such as the tubular body 20. Furthermore, as illustrated in FIG. 5, the shorter the second distance db that is a distance in the axial direction from the positioning fixture 33 of the terminal fitting 30 to the start end 2211 of the reduced diameter portion 221, the greater the angle of the shake of the terminal fitting 30, and the higher the possibility that the terminal fitting 30 breaks. That is, in a case where the shake width of the terminal fitting 30 is common to "y", an angle θ(1) of the shake of the terminal fitting 30 when the second distance db is "db(1)" is greater than an angle θ(2) of the shake of the terminal fitting 30 when the second distance db is "db(2)" that is longer than "db(1)". In addition, the greater the angle of the shake of the terminal fitting 30, the greater the load applied to the terminal fitting 30, and the higher the possibility that the terminal fitting 30 experiences metal fatigue and breaks. That is, the life of the terminal fitting 30 is determined by the ratio between the first distance Da and the second distance db, and the smaller a value obtained by dividing the second distance db by the first distance Da, the lower the durability of the terminal fitting 30. In the conventional sensor, the length of the second distance db is short. Therefore, the angle of the shake of the terminal fitting 30 is large and the durability performance of the terminal fitting 30 is low.

As has been described above with reference to FIGS. 4 and 5, the inventors of the present invention have found the following problem with the conventional gas sensor in which the second distance db that is a distance in the axial direction from the start end of the reduced diameter portion of the tubular body to the positioning fixture of the terminal fitting is short. That is, the inventors of the present invention have found a problem that when this conventional gas sensor is repeatedly used in an environment where vibrations are applied to the gas sensor, there is a higher possibility that the terminal fitting electrically connecting the sensor element and the lead wire to each other experiences metal fatigue and breaks.

The present invention has been made in view of such circumstances in one aspect, and an object of the present invention is to provide a gas sensor that reduces a possibility that a terminal fitting electrically connecting a sensor element and a lead wire to each other breaks due to vibrations applied to the gas sensor.

In order to solve the above-described problem, the present invention employs the following configuration.

A gas sensor according to a first aspect is a gas sensor capable of detecting a specific gas concentration of a gas to be measured. The gas sensor includes: a sensor element that extends in an axial direction and includes a detection unit on a front end side and an element electrode on a rear end side; a terminal fitting that extends in the axial direction and includes an element contact portion electrically connected to the element electrode on the front end side; a ceramic housing that houses the element electrode and the element contact portion; a tubular body that has an open end and in which the sensor element, the terminal fitting, and the ceramic housing are disposed; a lead wire, the front side of which is crimped and fixed to a lead wire holder formed in the terminal fitting on the rear end side, and the rear end side of which extends outward from the open end; and an elastic body that is disposed so as to seal the open end and into which the lead wire is inserted. The terminal fitting includes a positioning fixture that is locked to the ceramic housing to fix a position of the terminal fitting with respect to the ceramic housing. The tubular body includes, on the front end side, a protrusion that is in contact with an external member, to which the gas sensor is to be attached, and prevents leakage of the gas to be measured from a space defined by the external member. A reduced diameter portion that caulks a portion of the elastic body that accommodates the lead wire therein and extends in the axial direction from a periphery is formed in the tubular body on the rear end side. A value obtained by dividing (2) a second distance db that is a distance in the axial direction from a start end that is an end of the reduced diameter portion on a frontmost end side to the positioning fixture by (1) a first distance Da that is a distance in the axial direction from the start end to the protrusion is 0.24 or more and 0.39 or less. Note that one or a plurality of the reduced diameter portions are formed in the tubular body on the rear end side. In other words, one or more reduced diameter portions are formed in the tubular body on the rear end side. In addition, in a case where a plurality of reduced diameter portions are formed, the start end is an end on the frontmost end side of the reduced diameter portion on the frontmost end side in the axial direction out of the plurality of reduced diameter portions. Furthermore, the first distance Da is a distance from the start end to the protrusion (particularly, a surface of the protrusion that is in contact with the external member (for example, an exhaust pipe)).

In this configuration, in the gas sensor, the positioning fixture is locked to the ceramic housing, so that the terminal fitting is fixed to the ceramic housing. In addition, in the gas sensor, the lead wire holder of the terminal fitting crimps and holds the lead wire, that is, the terminal fitting is fixed to the lead wire. Furthermore, the reduced diameter portion of the tubular body caulks the periphery of the "portion of the elastic body that accommodates the lead wire therein and extends in the axial direction", so that the lead wire is fixed. Therefore, the reduced diameter portion of the tubular body fixes the lead wire and the terminal fitting that crimps and holds the lead wire.

Here, the gas sensor is used, for example, in a mode in which the front end side thereof is exposed to the inside of the exhaust pipe of an automobile and in a state in which the front end side is fixed to the exhaust pipe. In such a state, vibrations of the exhaust pipe are transmitted from the protrusion of the tubular body or the like. In other words, vibrations are applied to the gas sensor. At this time, the phase of the shake of surface members (outer members) of the gas sensor extending in the axial direction does not necessarily coincide with the phase of the shake of inner members of the gas sensor (members housed inside the gas sensor). For example, (1) the phase of the shake of the surface members such as the tubular body does not necessarily coincide with (2) the phase of the shake of the inner members such as the sensor element extending in the axial direction and the terminal fitting, which is electrically connected to the sensor element and the position of which is fixed inside the ceramic housing.

In addition, in a case where the phase of the shake of the tubular body and the like and the phase of the shake of the sensor element (and the terminal fitting) do not coincide with each other, a load is applied to the terminal fitting, so that there is a possibility that the terminal fitting experiences metal fatigue and breaks. As a portion of the terminal fitting prone to experience metal fatigue, for example, the positioning fixture is considered. The positioning fixture is locked to the ceramic housing to fix the position of the terminal fitting with respect to the ceramic housing.

In general, the longer the first distance Da, the greater the shake of the surface members of the gas sensor such as the tubular body. In addition, there is a higher possibility that a portion, of the terminal fitting as a metal component, located between the start end of the reduced diameter portion and the positioning fixture of the terminal fitting breaks due to the influence of this shake. Note that in a case where a plurality of reduced diameter portions that caulk the elastic body from the periphery are formed in the tubular body on the rear end side, the start end is an end on the frontmost end side of the reduced diameter portion on the frontmost end side in the axial direction out of the plurality of reduced diameter portions. As the shake that could cause breakage of the terminal fittings, the shake in parallel to the axial direction (longitudinal direction) of the gas sensor is ignored.

In addition, in a case where the shake width (distance of the shake in a direction orthogonal to the axial direction) of the terminal fitting can be regarded as constant, in general, the shorter the second distance db, the greater the angle of the shake of the terminal fitting, the greater the load applied to the terminal fitting, and the higher the possibility that the terminal fitting breaks. That is, when the second distance db is shortened, the angle of the shake of the terminal fitting increases, whereby the terminal fitting experiences metal fatigue, so that there is a higher possibility that the terminal fitting breaks.

The inventors of the present invention have found that it is effective to set the second distance db to a sufficiently large value with respect to the first distance Da in order to reduce the possibility that the terminal fitting electrically connecting the sensor element and the lead wire to each other breaks due to vibrations applied to the gas sensor.

The inventors of the present invention have further conducted studies and a durability performance comparison test of the terminal fitting, and have confirmed the following phenomenon. That is, the inventors of the present invention have confirmed that the metal fatigue of the terminal fitting due to vibrations applied to the gas sensor can be reduced by setting a value obtained by dividing the second distance db by the first distance Da to 0.24 or more.

Here, when the value obtained by dividing the second distance db by the first distance Da increases, the positioning fixture of the terminal fitting is brought closer to the front end side of the sensor element. In other words, the terminal fitting is brought closer to a heat source disposed in the gas sensor on the front end side. Therefore, when the value obtained by dividing the second distance db by the first distance Da increases, there is a concern that the terminal fitting that electrically connects the sensor element and the lead wire is exposed to a high temperature and experiences metal deterioration or the like, whereby a contact failure occurs. In view of the above, in order to ensure a sufficient distance from the heat source to the terminal fitting, the value obtained by dividing the second distance db by the first distance Da is set to be small, specifically, "0.39" or less. By setting the value obtained by dividing the second distance db by the first distance Da to 0.39 or less, it becomes possible to avoid a situation in which "the terminal fitting is exposed to a high temperature and experiences metal deterioration or the like, whereby a contact failure occurs".

Therefore, by dividing the second distance db by the first distance Da to 0.24 or more and 0.39 or less, the gas sensor can achieve the following advantageous effect by setting the value obtained. That is, the gas sensor can achieve an advantageous effect of reducing a possibility of breakage of the terminal fitting 30 due to vibrations while avoiding a situation in which "the terminal fitting is exposed to a high temperature and experiences metal deterioration or the like, whereby a contact failure occurs".

A gas sensor according to a second aspect is the gas sensor according to the first aspect, wherein the first distance Da may be 51.6 mm or more.

In this configuration, in the gas sensor, the first distance Da is 51.6 mm or more. As described above, the first distance Da is a distance in the axial direction from the start end that is an end of the reduced diameter portion on the frontmost end side to the protrusion. Therefore, if the first distance Da is to be shortened, the axial direction of the entire gas sensor is shortened. In addition, if the length of the entire gas sensor in the axial direction is shortened, it is difficult to ensure a sufficient distance from the front end of the gas sensor, particularly, from the heat source disposed in the gas sensor on the front end side, to the elastic body. That is, if the first distance Da is to be shortened, it is difficult to ensure a sufficient distance from the heat source to the elastic body, so that the elastic body is exposed to a high temperature and possibly undergoes erosion.

In view of the above, in the gas sensor, the first distance Da is set to 51.6 mm or more. By setting the first distance Da to 51.6 mm or more, the gas sensor can ensure a sufficient distance from the heat source disposed in the gas sensor on the front end side to the elastic body. Therefore, the gas sensor can achieve an advantageous effect of reducing the possibility that the elastic body is exposed to a high temperature and undergoes erosion.

A gas sensor according to a third aspect is the gas sensor according to the first or second aspect, wherein the second distance db may be 20.0 mm or less.

In this configuration, in the gas sensor, the second distance db is 20.0 mm or less. As described above, the second distance db is a distance in the axial direction from the start end that is an end of the reduced diameter portion on the frontmost end side to the positioning fixture of the terminal fitting. Therefore, if the second distance db is to be increased, the ceramic housing and the terminal fitting are brought closer to the front end of the gas sensor, particularly, to the heat source disposed in the gas sensor on the front end side. That is, if the second distance db is to be increased, the terminal fitting is brought closer to the heat source, thus being exposed to a high temperature, becoming more susceptible to deterioration.

In view of the above, in the gas sensor, the second distance db is set to 20.0 mm or less. By setting the second distance db to 20.0 mm or less, the gas sensor can ensure a sufficient distance from the heat source to the ceramic housing and the terminal fitting. Therefore, the gas sensor can achieve an advantageous effect of preventing the terminal fitting from being exposed to a high temperature and becoming more susceptible to deterioration.

A gas sensor according to a fourth aspect is the gas sensor according to any one of the first to third aspects, the gas sensor may further include a spacer disposed between the ceramic housing and the elastic body in the axial direction. In this configuration, the gas sensor further includes a spacer disposed between the ceramic housing and the elastic body in the axial direction. That is, in the gas sensor, the elastic body is disposed on a more rear end side than the ceramic housing and the spacer in the axial direction. Therefore, the gas sensor can achieve an advantageous effect of effectively preventing the heat generated from the heat source disposed in the gas sensor on the front end side from being transmitted to the elastic body by the ceramic housing and the spacer. Note that the spacer, which is disposed on a more front end side than the elastic body in the axial direction, is preferably made of a heat resistant material. By forming the spacer using a heat resistant material, it is possible to prevent the occurrence of a situation in which the spacer, which is disposed on a more front end side than the elastic body in the axial direction, undergoes erosion due to heat generated from the heat source.

According to the present invention, it is possible to provide a gas sensor that reduces the possibility that a terminal fitting electrically connecting a sensor element and a lead wire to each other breaks due to vibrations applied to the gas sensor.

BRIEF DESCRIPTION OF DRAWINGS

FIG. 5 is a view for describing a relationship between a magnitude of a load applied to a terminal fitting when vibrations are applied to the gas sensor and a second distance db.

Figure 1:
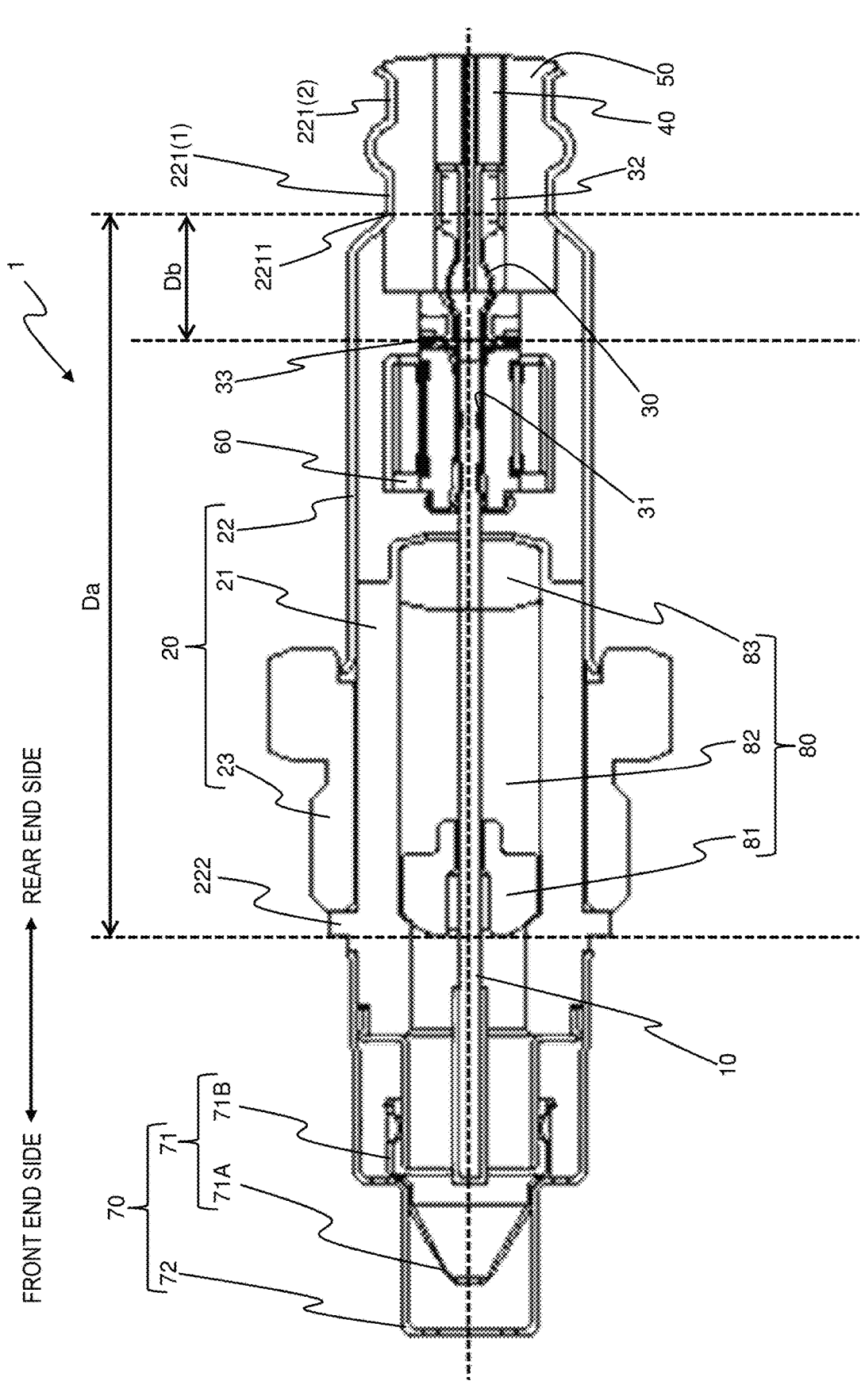
FIG. 1 is a partial schematic cross-sectional view schematically illustrating an example of a main configuration of a gas sensor according to an embodiment.

DETAILED DESCRIPTION OF THE
PREFERRED EMBODIMENT

Hereinafter, an embodiment (hereinafter, also referred to as "the present embodiment") according to one aspect of the present invention will be described with reference to the drawings. However, the present embodiment described below is merely an example of the present invention in all respects. It goes without saying that various improvements and modifications can be made without departing from the scope of the present invention. That is, in the practice of the present invention, a specific configuration according to the embodiment may be appropriately employed.

The inventors of the present invention have found a problem that when vibrations are repeatedly applied to a gas sensor, there is a possibility that a terminal fitting fixed inside the gas sensor (particularly, inside a tubular body included in the gas sensor) and electrically connecting a sensor element and a lead wire to each other experiences metal fatigue and breaks. The inventors of the present invention have conducted studies on the problem, and have identified the following phenomenon.

That is, in general, a gas sensor has a portion (member) in contact with an external member (for example, an exhaust pipe to which the gas sensor is to be attached). For example, a gas sensor (particularly, a tubular body included in the gas sensor) according to one aspect of the present invention includes a protrusion that is in contact with an external member and prevents leakage of a gas to be measured from a space defined by the external member. Vibrations are transmitted from the external member to the gas sensor via such a portion (for example, the protrusion) in contact with the external member. In other words, vibrations are applied to the gas sensor. At this time, the phase of the shake of the surface members (outer members) of the gas sensor extending in the axial direction (longitudinal direction) of a sensor element does not necessarily coincide with the phase of the shake of the inner members of the gas sensor (members housed inside the gas sensor). For example, (1) the phase of the shake of the surface members such as the tubular body does not necessarily coincide with (2) the phase of the shake of the inner members such as the sensor element extending in the axial direction and a terminal fitting, which is electrically connected to the sensor element and the position of which is fixed inside a ceramic housing. In addition, the inventors of the present invention have found that in a case where the phase of the shake of the tubular body and the like and the phase of the shake of the sensor element (and the terminal fitting) do not coincide with each other, a load is applied to the terminal fitting, so that there is a higher possibility that the terminal fitting breaks due to such a load.

The inventors of the present invention have further conducted studies and found that it is effective to increase a second distance db with respect to a first distance Da in order to reduce the "metal fatigue of the terminal fitting due to vibrations applied to the gas sensor". Here, the first distance Da is a distance in the axial direction from a start end to the portion (for example, the protrusion) where the gas sensor is in contact with the external member. The start end is an end on the frontmost end side of a reduced diameter portion formed in the tubular body on the rear end side. The reduced diameter portion caulks a portion of an elastic body that accommodates the lead wire therein from the periphery to fix the elastic body to the tubular body. In addition, the second distance db is a distance in the axial direction from the start end to a positioning fixture that fixes the terminal fitting to the ceramic housing.

The inventors of the present invention have found that the longer the first distance Da, the greater the shake of the surface members of the gas sensor such as the tubular body, the greater a load applied to the terminal fitting located between the start end and the positioning fixture due to the influence of this shake, and the higher the possibility that the terminal fitting breaks. In addition, the inventors of the present invention have found that the shorter the second distance db, the greater the angle of the shake of the terminal fitting, and the higher the possibility that the terminal fitting experiences metal fatigue and breaks. In view of the above, the inventors of the present invention have considered that the "metal fatigue of the terminal fitting due to vibrations applied to the gas sensor" can be reduced by increasing a value obtained by dividing the second distance db by the first distance Da (that is, db/Da), and have obtained a desirable range of "db/Da" by a test. Specifically, the inventors of the present invention have conducted a durability performance comparison test of the terminal fitting on a plurality of gas sensors with different "db/Da" values. As a result, the inventors of the present invention have confirmed that in a case where "db/Da" is 0.24 or more, that is, in a case where "0.24≤db/Da" is satisfied, the "metal fatigue of the terminal fitting due to vibrations applied to the gas sensor" can be reduced.

Furthermore, the inventors of the present invention have confirmed that the first distance Da is desirably set to 51.6 mm or more, and the second distance db is desirably set to 20.0 mm or less. Therefore, the value obtained by dividing the second distance db by the first distance Da (db/Da) is desirably set to "0.39" or less. When the value obtained by dividing the second distance db by the first distance Da increases, the positioning fixture of the terminal fitting is brought closer to the front end side of the sensor element. That is, when the value obtained by dividing the second distance db by the first distance Da increases, the terminal fitting is brought closer to a heat source on the front end side of the gas sensor. Therefore, there is a concern that the terminal fitting electrically connecting the sensor element and the lead wire to each other experiences metal deterioration or the like, whereby a contact failure occurs. In view of the above, in order to ensure a sufficient distance from the heat source to the terminal fitting, the value obtained by dividing the second distance db by the first distance Da is set to be small, specifically, "0.39" or less. By setting the value obtained by dividing the second distance db by the first distance Da to 0.39 or less, it becomes possible to avoid a situation in which "the terminal fitting is exposed to a high temperature and experiences metal deterioration or the like, whereby a contact failure occurs". That is, it is desirable that "db/Da≤0.39". By satisfying "db/Da≤0.39", it becomes possible to avoid the situation in which "the terminal fitting is exposed to a high temperature and experiences metal deterioration or the like, whereby a contact failure occurs".

Note that in the following description, the condition "0.24≤db/D a≤0.39" that "db/Da" is to satisfy is also referred to as "condition 1".

In view of the above, in the gas sensor according to one aspect of the present invention, the first distance Da and the second distance db satisfy the above-described condition 1. In other words, the value obtained by dividing the second distance db by the first distance Da is 0.24 or more and 0.39 or less. Therefore, the gas sensor according to one aspect of the present invention can reduce metal fatigue of the terminal fitting due to vibrations applied to the gas sensor and reduce a possibility of breakage of the terminal fitting while avoiding that "the terminal fitting is exposed to a high temperature, whereby a contact failure occurs". In the following description, a gas sensor 1 will be described first as the gas sensor according to one aspect of the present invention with reference to FIG. 1.

Configuration Example

<Overview of Gas Sensor>

FIG. 1 is a schematic cross-sectional view schematically illustrating a configuration example of the gas sensor 1 according to the present embodiment. That is, FIG. 1 schematically illustrates a configuration of a cross section of the gas sensor 1. The cross section is parallel to and in contact with the longitudinal axis (axis line, a line along the left-right direction in the drawing) of the gas sensor 1. The gas sensor 1 is an example of the "gas sensor" of the present invention. The gas sensor 1 is capable of detecting a concentration of a specific gas (specific gas concentration) such as oxygen and NOx in a gas to be measured such as an exhaust gas of an automobile. As illustrated in FIG. 1, the gas sensor 1 has an axis and is formed to extend along the longitudinal direction (axial direction). The gas sensor 1 has a front end and a rear end as respective ends in the longitudinal direction. One end in the longitudinal direction is the front end, and the other end is the rear end. In the example in FIG. 1, the gas sensor 1 is disposed such that the front end of the gas sensor 1 faces left, and the rear end of the gas sensor 1 faces right. That is, the left-right direction in FIG. 1 corresponds to the longitudinal direction (axial direction). In the present embodiment, the gas sensor 1 includes a sensor element 10, a tubular body 20, terminal fittings 30, lead wires 40, an elastic body 50, a ceramic housing 60, and a protective cover 70. In the gas sensor 1, the sensor element 10 is surrounded by the tubular body 20 and the protective cover 70. The tubular body 20 and the protective cover 70 form a housing member (casing) that houses the sensor element 10 therein as a whole. The sensor element 10 is disposed concentrically with the tubular body 20 and the protective cover 70. The extending direction of the central axis of the sensor element 10 coincides with the axial direction of the gas sensor 1.

(Sensor Element)

The sensor element 10 is an example of the "sensor element" of the present invention, and is formed to extend along the axial direction (the left-right direction in FIG. 1). The sensor element 10 illustrated in FIG. 1 is an element with an elongated flat plate shape (elongated plate shape). The sensor element 10 includes a detection unit (not illustrated) on the front end side, and an element electrode (not illustrated) on the rear end side. The front end side of the sensor element 10 illustrated in FIG. 1 is coated with an outer porous layer. The outer porous layer serves as a protective layer that resists cracking caused in the element body of the sensor element 10 by adhesion of moisture or the like in the gas to be measured, for example.

In the gas sensor 1, the sensor element 10 is disposed such that the front end side faces the front end of the gas sensor 1. For example, in one mode of the sensor element 10, a gas to be measured introduced into the sensor element 10 is reduced or decomposed in the sensor element 10, so that oxygen ions are generated. In the gas sensor 1 including such a sensor element 10, the concentration of the specific gas is obtained on the basis of the fact that the amount of oxygen ions flowing inside the sensor element 10 is proportional to the concentration of the specific gas, which is a sensing target gas in the gas to be measured.

In the example illustrated in FIG. 1, the front end side of the sensor element 10 is surrounded by the protective cover 70, and the rear end side protrudes into an outer tube 22. The substantially central portion of the sensor element 10 between the front end side and the rear end side is fixed inside a metallic shell 21 in a mode in which the portion between both ends is airtightly sealed by an annularly-mounted member 80.

(Annularly-Mounted Member)

In the example illustrated in FIG. 1, the annularly-mounted member 80 includes a first ceramic supporter 81, a powder compact 82, and a second ceramic supporter 83. The first ceramic supporter 81 and the second ceramic supporter 83 are ceramic insulators. More specifically, the first ceramic supporter 81 and the second ceramic supporter 83 each have a through hole (not illustrated) at each axial center position. The through hole has a shape corresponding to the cross-sectional shape of the sensor element 10. The sensor element 10 is inserted through the through holes, whereby the first ceramic supporter 81 and the second ceramic supporter 83 are annularly mounted on the sensor element 10. Note that the first ceramic supporter 81 is locked to a tapered surface of the metallic shell 21 on the left side of the drawing.

On the other hand, the powder compact 82 is obtained by molding ceramic powders such as talc. The powder compact 82 is obtained as follows. Two molded bodies (not illustrated) are annularly mounted on the sensor element 10 by the sensor element 10 being inserted through a through hole, similarly to the first ceramic supporter 81 and the second ceramic supporter 83. The two molded bodies in a state of annularly mounted around the sensor element 10 are disposed inside the metallic shell 21, and are then further compressed to be integral with each other. More specifically, ceramic particles forming the powder compact 82 are densely filled in a space surrounded by the first ceramic supporter 81, the second ceramic supporter 83, and the metallic shell 21. The space is formed inside the metallic shell 21 and through which the sensor element 10 passes. Airtight sealing between the front end side and the rear end side of the sensor element 10 is achieved through compression filling of the powder compact 82.

FIG. 1 illustrates an example in which the annularly-mounted member 80 includes the first ceramic supporter 81, the powder compact 82, and the second ceramic supporter 83. However, in the gas sensor 1, the annularly-mounted member 80 does not necessarily include the first ceramic supporter 81, the powder compact 82, and the second ceramic supporter 83. The gas sensor 1 illustrated in FIG. 1 includes the annularly-mounted member 80 that fixes the sensor element 10 inside the metallic shell 21 and airtightly seals the sensor element 10 between the front end side and the rear end side.

(Tubular Body)

The tubular body 20 is an example of the "tubular body" of the present invention. The tubular body 20 is, for example, a metal made cylindrical (for example, circular cylindrical) member, and has an open end. The sensor element 10, the terminal fittings 30, and the ceramic housing 60 are disposed inside the tubular body 20. In the example illustrated in FIG. 1, the tubular body 20 includes the cylindrical metallic shell 21, the cylindrical outer tube 22, and a fixing bolt 23, all of which are formed of a metal member.

The metallic shell 21 is a metal made cylindrical (for example, circular cylindrical) member. The sensor element 10 and the annularly-mounted member 80, which is annularly mounted on the sensor element 10 for fixing the sensor element 10, are housed inside the metallic shell 21. That is, the metallic shell 21 is annularly mounted around the annularly-mounted member 80, which is annularly mounted around the sensor element 10. The metallic shell 21 illustrated in FIG. 1 is formed to surround the sensor element 10 along the axial direction (longitudinal direction), and is particularly formed to surround the sensor element 10 within a range excluding a part on the front end side and a part on the rear end side.

The metallic shell 21 includes a protrusion 222 on the front end side. The protrusion 222 is in contact with an external member (for example, an exhaust pipe of an automobile) to which the gas sensor 1 is to be attached, and prevents leakage of a gas to be measured from a space defined by the external member. In the example illustrated in FIG. 1, the protrusion 222 protruding outward in a radial direction of the metallic shell 21 is formed in the metallic shell 21 on the front end side. The protrusion 222 is an example of the "protrusion" of the present invention. For example, a bolt portion of the fixing bolt 23 is screwed with a nut (nut portion) of a sensor fixing member provided in the exhaust pipe, so that the gas sensor 1 is fixed to the exhaust pipe. In such a state, the protrusion 222 is in contact with the sensor fixing member, and prevents leakage of an exhaust gas from the exhaust pipe.

The outer tube 22 is a metal made cylindrical (for example, circular cylindrical) member. The outer tube 22 illustrated in FIG. 1 covers the periphery of the rear end of the sensor element 10 and the ceramic housing 60 (terminal fittings 30).

An end (open end) of the outer tube 22 on the front end side is welded and fixed to an outer peripheral end of the metallic shell 21 on the rear end side. In addition, at an open end of the outer tube 22 on the rear end side, the elastic body 50 is disposed so as to seal the open end. A reduced diameter portion 221 is formed in the outer tube 22 on the rear end side. The reduced diameter portion 221 caulks a portion of the elastic body 50, which is provided to seal the open end on the rear end side, from the periphery. The reduced diameter portion 221 is an example of the "reduced diameter portion" of the present invention. In the reduced diameter portion 221, the outer tube 22 is caulked from the outside in a diameter-reduced manner over the entire circumferential direction thereof, so that a reaction force directed outward in the radial direction is generated in the elastic body 50, whereby the outer tube 22 is sealed.

In addition, the lead wires 40 are drawn out from the open end of the outer tube 22 on the rear end side, which is sealed by the elastic body 50, through a through hole (not illustrated) formed inside the elastic body 50. An outside air (atmospheric air) is introduced into an inner space of the outer tube 22 through between a coating and a metallic wire (conductor) of each lead wire 40 (in other words, the inside of the coating), so that the inner space of the outer tube 22 becomes a reference gas atmosphere. The rear end of the sensor element 10 is disposed in the inner space of the outer tube 22 filled with the reference gas.

The fixing bolt 23 is an annular member used to fix the gas sensor 1 to a measurement position (attachment position), and is fixed concentrically with the metallic shell 21. The fixing bolt 23 includes a threaded bolt portion and a held portion to be held when the bolt portion is screwed. The bolt portion of the fixing bolt 23 is to be screwed with a nut provided in the attachment position of the gas sensor 1. For example, the bolt portion of the fixing bolt 23 is screwed with a nut (nut portion) provided in an exhaust pipe of an automobile, so that the gas sensor 1 is fixed to the exhaust pipe in a mode in which a protective cover 70 side of the gas sensor 1 is exposed to the inside of the exhaust pipe.

As has been described above, the tubular body 20 illustrated in FIG. 1 includes the metallic shell 21, the outer tube 22, and the fixing bolt 23, and is formed as a cylindrical (for example, circular cylindrical) member as a whole. The tubular body 20 is particularly formed as a cylindrical member extending in the axial direction. That is, the tubular body 20 illustrated in FIG. 1 is a circular cylindrical member, extending in the axial direction, including the cylindrical metallic shell 21, the cylindrical outer tube 22 welded and fixed to the outer peripheral end of the metallic shell 21 on the rear end side, and the fixing bolt 23 disposed on the outer periphery of the metallic shell 21 on the front end side. For example, the tubular body 20 and the gas sensor 1 (sensor element 10) are concentrically provided. The tubular body 20 has a front end and a rear end as respective ends in the axial direction (longitudinal direction). The tubular body 20 is disposed such that the front end faces the front end of the gas sensor 1. In addition, the sensor element 10, the annularly-mounted member 80, which is annularly mounted on the sensor element 10 for fixing the sensor element 10, the terminal fittings 30, and the ceramic housing 60 are housed inside the tubular body 20. The open end of the tubular body 20 on the rear end side is sealed by the elastic body 50. The reduced diameter portion 221 for fixing the elastic body 50 for sealing the open end of the tubular body 20 is formed in the tubular body 20 (outer tube 22) on the rear end side. The reduced diameter portion 221 caulks a portion of the elastic body 50 from the periphery. In addition, the tubular body 20 includes the protrusion 222 on the front end side. The protrusion 222 is in contact with an external member to which the gas sensor 1 is to be attached, and prevents leakage of a gas to be measured from a space defined by the external member.

In the example illustrated in FIG. 1, two reduced diameter portions 221 for fixing the elastic body 50 are formed in the tubular body 20 (outer tube 22) on the rear end side. Specifically, the reduced diameter portion 221(1) and the reduced diameter portion 221(2) are formed. The reduced diameter portion 221(1) and the reduced diameter portion 221(2) each caulk a portion of the elastic body 50 from the periphery, particularly, caulk a portion of the elastic body 50 that accommodates the lead wires 40 therein from the periphery. Note that, in the following description, in cases where it is not necessary to distinguish the reduced diameter portion 221(1) and the reduced diameter portion 221(2) from each other, the reduced diameter portion 221(1) and the reduced diameter portion 221(2) may be simply referred to as the "reduced diameter portion 221". Furthermore, in cases where a plurality of reduced diameter portions 221 are distinguished from each other, "(1)", "(2)", "(3)", . . . , "(n)", and "(n+1)" are added after the reference numeral "221" for the reduced diameter portions to distinguish each. Here, "n" is an integer of "1" or more.

The reduced diameter portion 221 formed in the tubular body 20 caulks the "portion of the elastic body 50 that accommodates the lead wires 40 therein (portion that accommodates the lead wires 40 therein and extends in the axial direction)" from the periphery. The reduced diameter portion 221 caulks the periphery of the "portion of the elastic body 50 that accommodates the lead wires 40 therein and extends in the axial direction", so that the positions of the lead wires 40 are fixed in the gas sensor 1. Although details will be described later, the lead wire 40 is crimped and held by a lead wire holder 32 of the terminal fitting 30, that is, crimped and fixed to the lead wire holder 32. Furthermore, the positions of the lead wires 40 are fixed by the reduced diameter portion 221. Therefore, in the gas sensor 1, the reduced diameter portion 221 fixes the positions of the lead wires 40 and the terminal fittings 30 (lead wire holders 32) crimped and fixed to the lead wires 40.

In the example illustrated in FIG. 1, the reduced diameter portion 221 caulks a "portion of the elastic body 50 that accommodates the lead wires 40 and the lead wire holders 32 of the terminal fittings 30 therein and extends in the axial direction" from the periphery. Specifically, the reduced diameter portion 221(1) caulks a "portion of the elastic body 50 that accommodates the lead wire holders 32 and the lead wires 40 (particularly, the front end side of the lead wires 40) crimped and fixed to the lead wire holders 32 therein" from the periphery. In addition, the reduced diameter portion 221(2) caulks the "portion of the elastic body 50 that accommodates the lead wires 40 therein" from the periphery. Therefore, in the gas sensor 1 illustrated in FIG. 1, the positions of the lead wires 40 and the lead wire holders 32 are each fixed by the reduced diameter portion 221.

Note that, in the gas sensor 1, the tubular body 20 does not necessarily include the metallic shell 21, the outer tube 22, and the fixing bolt 23. The tubular body 20 may not include the fixing bolt 23. The metallic shell 21 and the outer tube 22 may be an integrally formed member. In the gas sensor 1, it is sufficient that the tubular body 20 is a cylindrical member that has an open end and in which the sensor element 10, the terminal fittings 30, and the ceramic housing 60 are disposed.

In addition, in the gas sensor 1, the number of reduced diameter portions 221 formed in the tubular body 20 to fix the elastic body 50 is not necessarily two. Furthermore, in the gas sensor 1, the reduced diameter portion 221 does not necessarily caulk the "portion of the elastic body 50 that accommodates the lead wires 40 and the lead wire holders 32 of the terminal fittings 30 therein and extends in the axial direction" from the periphery. In the gas sensor 1, it is sufficient that the reduced diameter portion 221 caulks the "portion of the elastic body 50 that accommodates the lead wires 40 therein (portion that accommodates the lead wires 40 therein and extends in the axial direction)" from the periphery. The reduced diameter portion 221 fixes the positions of the lead wires 40, thereby fixing the positions of the terminal fittings 30 (lead wire holders 32) crimped and fixed to the lead wires 40.

(Terminal Fitting)

The terminal fitting 30 is an example of the "terminal fitting" in the present invention. The terminal fitting 30 is a metal member (contact member) extending in the axial direction. In the gas sensor 1, the sensor element 10 (particularly, the element electrode thereof) and the lead wire 40 are electrically connected to each other via the terminal fitting 30. As illustrated in FIG. 1, the terminal fitting 30 includes an element contact portion 31 on the front end side and the lead wire holder 32 on the rear end side. The element contact portion 31 is electrically connected to the element electrode of the sensor element 10. The lead wire holder 32 crimps and holds the lead wire 40. The terminal fitting 30 further includes a positioning fixture 33 that is locked to the ceramic housing 60 to fix the position of the terminal fitting 30 with respect to the ceramic housing 60. The positioning fixture 33 illustrated in FIG. 1 is a hook-shaped (L-shaped) member locked to the ceramic housing 60. The positioning fixture 33 may include a plate-shaped member extending in a direction intersecting the axial direction (for example, a direction orthogonal to the axial direction, the radial direction of the gas sensor 1). The front end side of the plate-shaped member may be bent along the axial direction. In the gas sensor 1, the positioning fixture 33 is locked to the ceramic housing 60, so that the terminal fitting 30 is fixed to the ceramic housing 60.

In the gas sensor 1, in a state where the terminal fitting 30 is fixed to the ceramic housing 60 by the positioning fixture 33, the element contact portion 31 is in contact with the element electrode of the sensor element 10, and the lead wire holder 32 crimps and holds the lead wire 40. The front end side of the terminal fitting 30, in which the lead wire 40 is crimped and held by the lead wire holder 32 in advance, may be inserted into the ceramic housing 60 to electrically connect the element contact portion 31 of the terminal fitting 30 and the element electrode of the sensor element 10 to each other. In addition, the positioning fixture 33 is locked to the ceramic housing 60 to fix the terminal fitting 30 to the ceramic housing 60.

In the terminal fitting 30, a portion between the element contact portion 31 and the lead wire holder 32 may be formed in a leaf spring shape. In the example illustrated in FIG. 1, the lead wire holders 32 of the terminal fittings 30 are housed inside the elastic body 50, for example, housed in the through holes formed inside the elastic body 50. In addition, the reduced diameter portion 221 caulks the "portion of the elastic body 50 that accommodates the lead wires 40 and the lead wire holders 32 of the terminal fittings 30 therein and extends in the axial direction" from the periphery. Furthermore, the element contact portions 31 of the terminal fittings 30 are housed in the ceramic housing 60. In other words, the element contact portions 31 and the element electrode of the sensor element 10 are electrically connected to each other in the ceramic housing 60.

(Ceramic Housing)

The ceramic housing 60 is an example of the "ceramic housing" of the present invention. The ceramic housing 60 is a ceramic member that houses the rear end side of the sensor element 10 (specifically, the element electrode provided in the sensor element 10 on the rear end side) and the front end sides of the terminal fittings 30 (specifically, the element contact portions 31). That is, in the gas sensor 1 illustrated in FIG. 1, the sensor element 10 (particularly, the element electrode) and the terminal fittings 30 (particularly, the element contact portions 31) are electrically connected to each other in the ceramic housing 60.

For example, the rear end side of the sensor element 10 provided with the element electrode is inserted into the ceramic housing 60 that houses the front end sides of the terminal fittings 30 (element contact portions 31). In this insertion state, the element electrode provided in the sensor element 10 on the rear end side and the front end sides of the terminal fittings 30 (element contact portions 31) are in contact with each other. The front end sides of the terminal fittings 30 (element contact portions 31) may be sandwiched and fixed between the rear end side of the sensor element 10 provided with the element electrode and the ceramic housing 60 to electrically connect the element electrode of the sensor element 10 and the terminal fittings 30 to each other.

The position (position in the axial direction, for example) of the ceramic housing 60 is fixed in the tubular body 20. Particularly, movement of the ceramic housing 60 toward the front end side is restricted. The position of the ceramic housing 60 in the tubular body 20 in the axial direction is fixed by, for example, a ceramic housing fixing member (not illustrated). Particularly, movement of the ceramic housing 60 toward the front end side is restricted. The ceramic housing fixing member may include, for example, a spring member and a caulking ring. The spring member presses the ceramic housing 60 inward in the radial direction inside the tubular body 20. The caulking ring presses the spring member to exert a spring force.

(Lead Wire)

The lead wire 40 is an example of the "lead wire" of the present invention. The lead wire 40 is electrically connected to the element electrode of the sensor element 10 via the terminal fitting 30, and extends outward from the open end of the tubular body 20. Specifically, the front end side of the lead wire 40 is electrically connected to the rear end side of the terminal fitting 30 (that is, lead wire holder 32), and the rear end side of the lead wire 40 extends outward from the open end of the tubular body 20. The front end side of the lead wire 40 is crimped and fixed to the lead wire holder 32 of the terminal fitting 30. In addition, as described above, a gap formed between the lead wires 40 and the tubular body 20 (outer tube 22) is sealed by the elastic body 50.

The lead wires 40 are inserted into the elastic body 50. For example, the lead wires 40 are inserted into the through holes (not illustrated) formed inside the elastic body 50. An end of the lead wire 40 on the front end side is crimped and fixed to the rear end side of the terminal fitting 30 (specifically, the lead wire holder 32), and an end of the lead wire 40 on the rear end side is connected to an external apparatus (controller), a power supply, or the like. As a result, the sensor element 10 (particularly, the element electrode of the sensor element 10) and the external apparatus, the power supply, or the like are electrically connected to each other via the terminal fittings 30 and the lead wires 40. Note that, in FIG. 1, an example is illustrated in which there are two terminal fittings 30 and two lead wires 40, but is merely for the sake of simplicity of illustration. In practice, the gas sensor 1 includes the necessary number of terminal fittings 30 and lead wires 40 for the above-described electrical connection.

In the gas sensor 1, for example, the outside air and the gas in the tubular body 20 pass through between the coating and the metallic wire (conductor) of each lead wire 40 (in other words, the inside of the coating), so that the outside air is introduced into the tubular body 20 and the gas in the tubular body 20 is discharged to the outside.

(Elastic Body)

The elastic body 50 is an example of the "elastic body" of the present invention. The elastic body 50 is a member with elasticity, and is made of rubber, for example. The elastic body 50 is disposed so as to seal an open end (in the example illustrated in FIG. 1, the open end on the rear end side) of the tubular body 20, and the lead wires 40 are inserted into the elastic body 50. Specifically, a through hole extending in the axial direction is formed inside the elastic body 50. For example, a plurality of through holes extending in the axial direction are formed. The lead wire 40 is housed in (inserted into) the through hole formed inside the elastic body 50. For example, each of a plurality of lead wires 40 is housed in (inserted into) a corresponding one of the plurality of through holes formed inside the elastic body 50. In the example illustrated in FIG. 1, each of the plurality of lead wires 40 and each of a plurality of lead wire holders 32 crimped and fixed to a corresponding one of the lead wires 40 is housed in (inserted into) the corresponding one of the plurality of through holes formed inside the elastic body 50.

The material of the elastic body 50 is, for example, fluororubber. Fluororubber has excellent properties in various aspects such as resistance and strength, and is particularly excellent in heat resistance and oil resistance. Therefore, by using the elastic body 50 made of fluororubber, the gas sensor 1 can achieve, for example, an advantageous effect that the sealing property of the elastic body 50 can be secured even in a high-temperature environment, and the detection accuracy of the gas concentration can be maintained and improved. However, in the gas sensor 1, the material of the elastic body 50 is not necessarily fluororubber. The gas sensor 1 may appropriately use a raw material with elasticity as a material of the elastic body 50.

(Protective Cover)

The protective cover 70 is a substantially circular cylindrical exterior member that protects a predetermined range of the sensor element 10 on the front end side. In the predetermined range, a portion of the sensor element 10 comes in direct contact with a gas to be measured during use. The protective cover 70 illustrated in FIG. 1 is formed to surround the periphery of at least a portion of the tubular body 20 (metallic shell 21) on the front end side along the axial direction (longitudinal direction), and extends beyond the front end of the sensor element 10. For example, the protective cover 70 is formed to surround a portion of the sensor element 10 and a portion of the tubular body 20 on the front end side around the axis. The protective cover 70 has a front end and a rear end as respective ends in the axial direction. The front end of the protective cover 70 is disposed on a more front end side of the gas sensor 1 than the front end of the sensor element 10.

The protective cover 70 is provided with a plurality of through holes (not illustrated) through which gas can pass. The gas to be measured flowing into the protective cover 70 through the through holes is a direct sensing target in the sensor element 10. Note that the type, the number of arrangements, the position of arrangement, the shape, and the like of the through holes provided in the protective cover 70 may be appropriately determined in consideration of the inflow mode of the gas to be measured into the protective cover 70.

In the example illustrated in FIG. 1, the protective cover 70 includes a bottomed cylindrical inner cover 71 and a bottomed cylindrical outer cover 72. The inner cover 71 covers the front end of the sensor element 10. The outer cover 72 covers the inner cover 71. The inner cover 71 includes a first member 71B and a second member 71A. The inner cover 71 is formed to cover the periphery of at least a portion of the sensor element 10 and a portion of the tubular body 20 (metallic shell 21) on the front end side. The first member 71B is formed to extend from an outer wall of the front end portion of the tubular body 20 along the axial direction, reduces its diameter in a direction perpendicular to the axial direction after passing the front end of the tubular body 20, and thereafter, further extends along the axial direction. The second member 71A is formed to cover the periphery of a portion of the first member 71B on the front end side. The outer cover 72 is formed to cover the periphery of the inner cover 71.

A space surrounded by the inner cover 71 forms a sensor element chamber. The front end of the sensor element 10 is disposed in the sensor element chamber. Openings are appropriately formed in the first member 71B and the second member 71A of the inner cover 71 and the outer cover 72. Through the openings, the sensor element chamber communicates with a space outside the protective cover 70. However, the configuration and the shape of the protective cover 70 are not limited to such an example. The configuration and the shape of the protective cover 70 may be appropriately determined according to the embodiment.

As the material of the protective cover 70, for example, a metal material such as stainless steel (for example, SUS) may be used. The protective cover 70 may be manufactured by appropriately molding a metal material. Note that the protective cover 70 may be omitted from the configuration of the gas sensor 1.

As has been described above, in the gas sensor 1, the terminal fitting 30 electrically connects the sensor element 10 and the lead wire 40 to each other. That is, the terminal fitting 30 is electrically connected to the element electrode of the sensor element 10 on the front end side in the axial direction (longitudinal direction) of the sensor element 10, and cramps and holds the lead wire 40 on the rear end side, so that the terminal fitting 30 electrically connects the sensor element 10 and the lead wire 40 to each other. In addition, the terminal fitting 30 includes the positioning fixture 33. For example, the positioning fixture 33 is locked to the ceramic housing 60, the position of which is fixed inside the gas sensor 1 (tubular body 20) to fix the position (particularly, the position in the axial direction) of the terminal fitting 30 with respect to the ceramic housing 60. In addition, the reduced diameter portion 221 that caulks the "portion of the elastic body 50 that accommodates the lead wires 40 therein" from the periphery is formed in the tubular body 20. By the reduced diameter portion 221, the elastic body 50 is fixed to the tubular body 20, and the lead wires 40 are also fixed to the tubular body 20.

As described above, in the gas sensor 1, the terminal fitting 30 crimps and holds the lead wire 40, that is, the terminal fitting 30 is fixed to the lead wire 40. Furthermore, the reduced diameter portion 221 formed in the tubular body 20 caulks the periphery of the "portion of the elastic body 50 that accommodates the lead wires 40 therein", so that the lead wires 40 are fixed to the tubular body 20. Therefore, in the gas sensor 1, the reduced diameter portion 221 of the tubular body 20 fixes the lead wires 40 inserted into the elastic body 50 and the terminal fittings 30 that crimp and hold the lead wires 40, in addition to the elastic body 50. In addition, as described above, in the gas sensor 1, the terminal fittings 30 are fixed to the ceramic housing 60 by the positioning fixtures 33.

In a case where vibrations are applied to such a gas sensor 1, there may arise a case in which the phase of the shake of the tubular body 20 and the like and the phase of the shake of the sensor element 10, terminal fittings 30, and the like, which are disposed inside the tubular body 20, do not coincide with each other. The inventors of the present invention have found that in a case where the phase of the shake of the tubular body 20 and the like and the phase of the shake of the sensor element 10, the terminal fittings 30, and the like disposed inside the tubular body 20 do not coincide with each other, a load is applied to the terminal fittings 30, so that there is a higher possibility that the terminal fittings 30 break due to such a load. In view of the above, the gas sensor 1 reduces metal fatigue of the terminal fittings 30 due to vibrations applied to the gas sensor 1 by adjusting the size and the like of each member. Hereinafter, conditions for the size and the like of each member to be satisfied by the gas sensor 1 will be described in detail.
(Size and the Like of Each Member)

In FIG. 1, "Da" represents a first distance Da that is a distance in the axial direction from a start end 2211, which is an "end of the reduced diameter portion 221 of the tubular body 20 on the frontmost end side in the axial direction", to the protrusion 222 of the tubular body 20. In the example illustrated in FIG. 1, the first distance Da is a distance in the axial direction from the start end 2211 to a surface of the protrusion 222 (an end face of the protrusion 222 on the front end side) that is in contact with an external member to which the gas sensor 1 is to be attached.

As described above, a plurality of reduced diameter portions 221 are formed in the tubular body 20 illustrated in FIG. 1. Specifically, the reduced diameter portion 221(1) and the reduced diameter portion 221(2) are formed. In a case where a plurality of reduced diameter portions 221 are formed in the tubular body 20, the start end 2211 is an "end on the frontmost end side" of the reduced diameter portion 221 on the frontmost end side in the axial direction out of the plurality of reduced diameter portions 221 formed in the tubular body 20. In the example illustrated in FIG. 1, the start end 2211 is an "end on the frontmost end side" of the reduced diameter portion 221(1), which is the reduced diameter portion 221 on the frontmost end side in the axial direction out of the plurality of reduced diameter portions 221. Therefore, in FIG. 1, "Da" represents the first distance Da that is a distance in the axial direction from the start end 2211 of the reduced diameter portion 221(1) to the protrusion 222 of the tubular body 20. Particularly, in the example illustrated in FIG. 1, the first distance Da is a distance in the axial direction from the start end 2211 of the reduced diameter portion 221(1) to the end face (front end face) of the protrusion 222 on the front end side.

In the gas sensor 1, the first distance Da is, for example, 51.6 mm or more. As described above, the first distance Da is a distance in the axial direction from the start end 2211 that is an end of the reduced diameter portion 221 on the frontmost end side to the protrusion 222. Therefore, if the first distance Da is set to be shortened, the length of the entire gas sensor 1 in the axial direction is shortened. In addition, if the length of the entire gas sensor 1 in the axial direction is shortened, it is difficult to ensure a sufficient distance from the front end of the gas sensor 1, particularly, from the heat source disposed in the gas sensor 1 on the front end side, to the elastic body 50. That is, if the first distance Da is to be shortened, it is difficult to ensure a sufficient distance from the heat source to the elastic body 50, so that the elastic body 50 is exposed to a high temperature and possibly undergoes erosion.

In view of the above, by setting the first distance Da to, for example, 51.6 mm or more, the gas sensor 1 ensures a sufficient distance from the heat source disposed in the gas sensor 1 on the front end side to the elastic body 50. Therefore, the gas sensor 1 can achieve an advantageous effect of reducing the possibility that the elastic body 50 is exposed to a high temperature and undergoes erosion.

In FIG. 1, "db" represents a second distance db that is a distance in the axial direction from the start end 2211 of the reduced diameter portion 221 to the positioning fixture 33 of the terminal fitting 30. As described above, in a case where a plurality of reduced diameter portions 221 are formed in the tubular body 20, the start end 2211 is the "end on the frontmost end side" of the reduced diameter portion 221 on the frontmost end side out of the plurality of reduced diameter portions 221 formed in the tubular body 20. Therefore, in FIG. 1, "db" represents the second distance db that is a distance in the axial direction from the start end 2211 of the reduced diameter portion 221(1) to the positioning fixture 33 of the terminal fitting 30.

In the gas sensor 1, the second distance db is, for example, 20.0 mm or less. As described above, the second distance db is a distance in the axial direction from the start end 2211 that is an end of the reduced diameter portion 221 on the frontmost end side to the positioning fixture 33 of the terminal fitting 30. Therefore, if the second distance db is to be increased, the ceramic housing 60 and the terminal fitting 30 are brought closer to the front end of the gas sensor 1, particularly, to the heat source disposed in the gas sensor 1 on the front end side. That is, if the second distance db is to be increased, the terminal fitting 30 is brought closer to the heat source, thus being exposed to a high temperature, becoming more susceptible to deterioration.

In view of the above, in the gas sensor 1, the second distance db is set to, for example, 20.0 mm or less. By setting the second distance db to 20.0 mm or less, the gas sensor 1 ensures a sufficient distance from the heat source to the ceramic housing 60 and the terminal fitting 30. Therefore, the gas sensor 1 can achieve an advantageous effect of preventing the terminal fitting 30 from being exposed to a high temperature and becoming more susceptible to deterioration.

As described above, the first distance Da is desirably set to 51.6 mm or more, and the second distance db is desirably set to 20.0 mm or less. Therefore, the value obtained by dividing the second distance db by the first distance Da (db/Da) is desirably set to "20.0/51.6" or less, that is, desirably set to "0.39" or less. When the value obtained by dividing the second distance db by the first distance Da increases, the positioning fixture 33 of the terminal fitting 30 is brought closer to the front end side of the sensor element 10. In other words, the terminal fitting 30 is brought closer to the heat source disposed in the gas sensor 1 on the front end side. Therefore, when the value obtained by dividing the second distance db by the first distance Da increases, there is a concern that the terminal fitting 30 electrically connecting the sensor element 10 and the lead wire 40 to each other is exposed to a high temperature and experiences metal deterioration or the like, whereby a contact failure occurs. In view of the above, in order to ensure a sufficient distance from the heat source to the terminal fitting 30, the value obtained by dividing the second distance db by the first distance Da is set to be small, specifically, "0.39" or less. By setting the value obtained by dividing the second distance db by the first distance Da to 0.39 or less, it becomes possible to avoid a situation in which "the terminal fitting 30 is exposed to a high temperature and experiences metal deterioration or the like, whereby a contact failure occurs". That is, it is desirable that "db/Da≤0.39". By satisfying "db/Da≤0.39", it becomes possible to avoid the situation in which "the terminal fitting 30 is exposed to a high temperature and experiences metal deterioration or the like, whereby a contact failure occurs".

Furthermore, the inventors of the present invention have conducted a test (details will be described later) to compare durability performances of the terminal fittings 30, and have confirmed the following phenomenon. That is, the inventors of the present invention have confirmed that the "metal fatigue of the terminal fitting 30 due to vibrations applied to the gas sensor 1" can be reduced by setting the value obtained by dividing the second distance db by the first distance Da to 0.24 or more.

Therefore, by setting the value obtained by dividing the second distance db by the first distance Da to 0.24 or more and 0.39 or less, the gas sensor 1 can achieve the following advantageous effect. That is, the gas sensor 1 can achieve an advantageous effect of reducing a possibility of breakage of the terminal fitting 30 due to vibrations while avoiding the situation in which "the terminal fitting 30 is exposed to a high temperature and experiences metal deterioration or the like, whereby a contact failure occurs".

<Consideration on Configuration for Ensuring Sufficient Length for Second Distance db>

As has been described above, in the gas sensor according to the present invention, the value obtained by dividing the second distance db by the first distance Da, that is, "db/Da"

is, 0.24 or more and 0.39 or less. Here, in the gas sensor 1 described with reference to FIG. 1, the end face (front end face) of the elastic body 50 on the front end side is in contact with the end face (rear end face) of the ceramic housing 60 on the rear end side. However, in the gas sensor according to the present invention, the front end face of the elastic body 50 and the rear end face of the ceramic housing 60 are not necessarily in contact with each other. In the gas sensor according to the present invention, it is sufficient that the size (length) of the first distance Da and the second distance db are adjusted so as to satisfy the condition 1. In other words, it is sufficient that the size of each member is adjusted so as to satisfy the condition 1. In the gas sensor according to the present invention, a member (for example, a spacer 90, described later) may be disposed between the ceramic housing 60 and the elastic body 50 in the axial direction (longitudinal direction of the sensor element 10) to ensure a sufficient length for the second distance db. In the gas sensor according to the present invention, as long as the first distance Da and the second distance db satisfy the condition 1, the front end face of the elastic body 50 and the rear end face of the ceramic housing 60 may not be in contact with each other. Hereinafter, a "gas sensor in which the first distance Da and the second distance db satisfy the condition 1, and the front end face of the elastic body 50 and the rear end face of the ceramic housing are not in contact with each other" according to one aspect of the present invention will be described with reference to FIG. 2.

Figure 2:
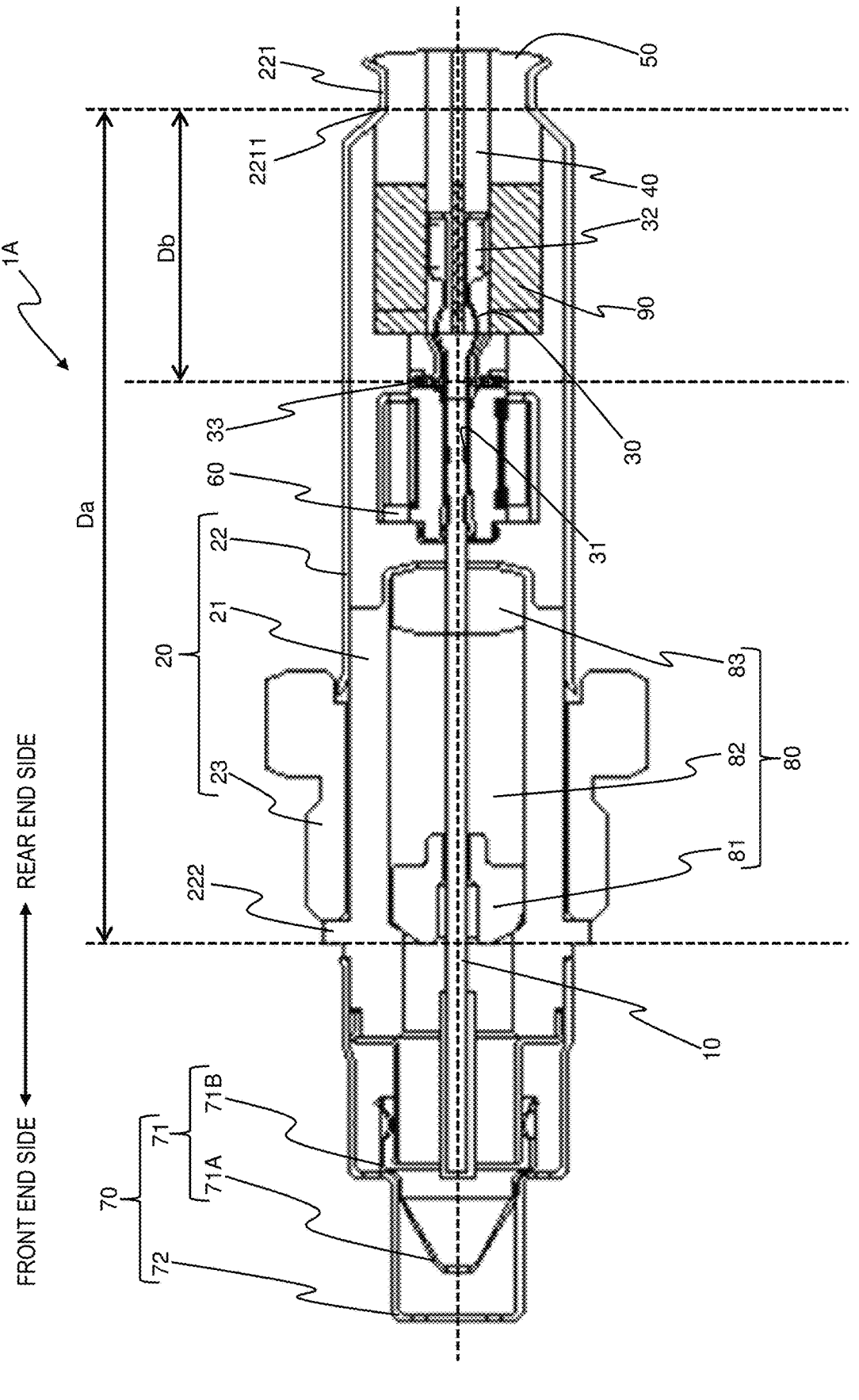
FIG. 2 is a partial schematic cross-sectional view schematically illustrating an example of a main configuration of a gas sensor according to a first modification.

FIG. 2 is a schematic cross-sectional view schematically illustrating a configuration example of a gas sensor 1A according to a first modification. That is, FIG. 2 schematically illustrates a configuration of a cross section of the gas sensor 1A. The cross section is parallel to and in contact with the longitudinal axis (axis line, a line along the left-right direction in the drawing) of the gas sensor 1A. The gas sensor 1A is an example of the "gas sensor" of the present invention. The gas sensor 1A is capable of detecting a concentration of a specific gas (specific gas concentration) such as oxygen and NOx in a gas to be measured such as an exhaust gas of an automobile. The gas sensor 1A has a configuration similar to the gas sensor 1, except for the inclusion of the spacer 90, in addition to the configuration included in the gas sensor 1, and thus detailed description of configurations other than the spacer 90 is omitted.

In the example in FIG. 2, the gas sensor 1A is disposed such that the front end of the gas sensor 1A faces left, and the rear end of the gas sensor 1A faces right. That is, the left-right direction in FIG. 2 corresponds to the longitudinal direction (axial direction). Similarly to the gas sensor 1, the gas sensor 1A includes the sensor element 10, the tubular body 20, the terminal fittings 30, the lead wires 40, the elastic body 50, the ceramic housing 60, and the protective cover 70. The gas sensor 1A further includes the spacer 90.

(Spacer)

The spacer 90 is an example of the "spacer" of the present invention. The spacer 90 is disposed between the ceramic housing 60 and the elastic body 50 in the axial direction of the gas sensor 1A (sensor element 10). That is, the spacer 90 is sandwiched (interposed) between the ceramic housing 60 and the elastic body 50 inside the tubular body 20 (outer tube 22). For example, movement (particularly, movement toward the front end side) of the spacer 90 in the axial direction is restricted by the ceramic housing 60.

The lead wires 40 are inserted into the spacer 90 illustrated in FIG. 2. Specifically, the spacer 90 houses the lead wires 40 and the terminal fittings 30 (particularly, the lead wire holders 32 that crimp and hold the lead wires 40). For example, a through hole extending in the axial direction is formed inside the spacer 90. Similarly to the elastic body 50, a plurality of through holes extending in the axial direction may be formed inside the spacer 90. The lead wire 40 and the lead wire holder 32 of the terminal fitting 30 are housed in (inserted into) the through hole formed inside the spacer 90. For example, each of the plurality of lead wires 40 and each of the plurality of lead wire holders 32 are housed in (inserted into) a corresponding one of the plurality of through holes formed inside the spacer 90. FIG. 2 illustrates an example in which two through holes are formed inside the spacer 90, and each of the two lead wires 40 and each of the two lead wire holders 32 are housed in a corresponding one of the two through holes. In addition, in the gas sensor 1A, the lead wire holders 32 and the lead wires 40 are electrically connected to each other in the spacer 90.

The spacer 90 is made of, for example, a heat resistant material. By forming the spacer 90 using a heat resistant material, it is possible to prevent the occurrence of a situation in which the spacer 90, which is disposed on the more front end side than the elastic body 50 in the axial direction, undergoes erosion due to heat generated from the heat source disposed in the gas sensor 1A on the front end side. For example, by interposing the spacer 90 between the elastic body 50 and the ceramic housing 60, it is possible to prevent an excessive temperature rise of the elastic body 50 during use, or the like, of the gas sensor 1. That is, from the viewpoint of reducing heat transfer to the elastic body 50, thermal conductivity of the spacer 90 is desirably low. However, while the temperature rise of the elastic body 50 is reduced by the spacer 90, the temperature of the spacer 90 becomes high, so that the spacer 90 itself needs to have sufficient heat resistance. In view of the above, by forming the spacer 90 using a heat resistant material, it is possible to prevent the occurrence of a situation in which the spacer 90 itself undergoes erosion due to heat generated from the heat source while reducing heat transfer from the heat source described above to the elastic body 50.

Note that FIG. 2 illustrates an example in which the spacer 90 is a single member, but the spacer 90 may be formed of a plurality of constituent elements (constituent members). For example, the spacer 90 may include a spacer front end side portion disposed on the front end side in the axial direction, and a spacer rear end side portion disposed on the rear end side. That is, the spacer 90 may have a multistage structure (for example, a two-stage structure) including the spacer front end side portion and the spacer rear end side portion.

In a case where the spacer 90 is used to prevent the temperature rise of the elastic body 50 during use of the gas sensor 1A, the spacer front end side portion and the spacer rear end side portion described above may each be configured as follows. That is, as a material for the spacer front end side portion disposed on the front end side in the axial direction, ceramics with a higher melting point than resin are selected because ceramics have excellent heat resistance as compared with the material for the spacer rear end side portion. Preferably, ceramics with a thermal conductivity of 32 W/m·K or less, which is preferable in heat insulating properties in addition to heat resistance, is selected. More preferably, alumina (thermal conductivity: 32 W/m·K) or steatite (thermal conductivity: 2 W/m·K) is selected. On the other hand, as a material for the spacer rear end side portion, which is in contact with the elastic body 50, a resin is selected rather than ceramics because resin has low thermal conductance. Preferably, the resin used for the spacer rear end side portion is polytetrafluoroethylene (PTFE, melting point of which is 327° C.) or perfluoroalkoxy alkane (PFA, melting point of which is 310° c.), both of which are fluororesins. These resins have not only low thermal conductivity but also higher heat resistance than the elastic body 50 made of rubber. For example, PTFE has a thermal conductivity of 0.2 W/m·K, and a maximum continuous use temperature (maximum temperature in a case where use at the maximum temperature continues) of 260° C.

In the gas sensor 1A illustrated in FIG. 2, the tubular body 20 (outer tube 22) covers the periphery of the rear end of the sensor element 10, the ceramic housing 60 (terminal fittings 30), and the spacer 90. That is, in the example illustrated in FIG. 2, the sensor element 10, the annularly-mounted member 80, which is annularly mounted on the sensor element 10 for fixing the sensor element 10, the ceramic housing 60 (terminal fittings 30), and the spacer 90 are housed inside the tubular body 20. The open end of the tubular body 20 on the rear end side is sealed by the elastic body 50.

In addition, in the gas sensor 1A, the lead wire 40 is inserted through, for example, the through hole (not illustrated) continuously formed in the elastic body 50 and the spacer 90. An end of the lead wire 40 on the front end side (non-coated portion) is crimped and fixed to the lead wire holder 32 of the terminal fitting 30. Note that, in FIG. 2, an example is illustrated in which there are two terminal fittings 30 and two lead wires 40, but is merely for the sake of simplicity of illustration. In practice, the gas sensor 1A includes the necessary number of terminal fittings 30 and lead wires 40 for the above-described electrical connection.

The lead wire holder 32 of the terminal fitting 30 illustrated in FIG. 2 is housed in the spacer 90. In other words, in the gas sensor 1A illustrated in FIG. 2, the lead wire holders 32 and the lead wires 40 are electrically connected to each other in the spacer 90. In addition, the element contact portions 31 of the terminal fittings 30 are housed in the ceramic housing 60.

Furthermore, in the example illustrated in FIG. 2, one reduced diameter portion that caulks the "portion of the elastic body 50 that accommodates the lead wires 40 therein (portion that accommodates the lead wires 40 therein and extends in the axial direction)" from the periphery is formed in the tubular body 20 on the rear end side. Specifically, the reduced diameter portion 221 is formed. The reduced diameter portion 221 caulks the periphery of the "portion of the elastic body 50 that accommodates the lead wires 40 therein and extends in the axial direction", so that positions of the lead wires 40 and the terminal fittings 30 (lead wire holders 32) crimped and fixed to the lead wires 40 are fixed. That is, in the gas sensor 1A, the positions of the lead wires 40 and the lead wire holders 32 are fixed by the reduced diameter portion 221, similarly to the gas sensor 1.

As has been described above, the gas sensor 1A illustrated in FIG. 2 further includes the spacer 90 in addition to the configuration included in the gas sensor 1 described with reference to FIG. 1. That is, the gas sensor 1A includes the spacer 90 disposed between the ceramic housing 60 and the elastic body 50 in the axial direction. In the gas sensor 1A, the elastic body 50 is disposed on a more rear end side than the ceramic housing 60 and the spacer 90 in the axial direction. Therefore, the gas sensor 1A can achieve an advantageous effect of effectively preventing the heat generated from the heat source disposed in the gas sensor 1A on the front end side from being transmitted to the elastic body 50 by the ceramic housing 60 and the spacer 90. Note that the spacer 90, which is disposed on a more front end side than the elastic body 50 in the axial direction, is preferably made of a heat resistant material. By forming the spacer 90 by using a heat resistant material, it is possible to prevent the occurrence of a situation in which the spacer 90, which is disposed on a more front end side than the elastic body 50 in the axial direction, undergoes erosion due to heat generated from the heat source described above.

Note that the gas sensor 1A has a configuration similar to the gas sensor 1, except for the inclusion of the spacer 90. That is, similarly to the gas sensor 1, the gas sensor 1A is a gas sensor capable of detecting a specific gas concentration of a gas to be measured, and includes the sensor element 10, the terminal fittings 30, the ceramic housing 60, the tubular body 20, the lead wires 40, and the elastic body 50. Furthermore, in the gas sensor 1A illustrated in FIG. 2, one reduced diameter portion 221 is formed in the tubular body 20 on the rear end side. The reduced diameter portion 221 caulks the "portion of the elastic body 50 that accommodates the lead wires 40 therein and extends in the axial direction" from the periphery.

In the gas sensor 1A, the value obtained by dividing the second distance db by the first distance Da is 0.24 or more and 0.39 or less. The first distance Da is a distance in the axial direction from the start end 2211 of the reduced diameter portion 221 to the protrusion 222. For example, the first distance Da is a distance in the axial direction from the start end 2211 to a surface of the protrusion 222 (in the example illustrated in FIG. 2, the end face of the protrusion 222 on the front end side) that is in contact with an external member (for example, an exhaust pipe) to which the gas sensor 1A is to be attached. The start end 2211 is an end of the reduced diameter portion 221 on the frontmost end side in the axial direction. In the gas sensor 1A illustrated in FIG. 2, the number of reduced diameter portions 221 formed in the tubular body 20 on the rear end side is one, and the end of the one reduced diameter portion 221 on the frontmost end side in the axial direction is the start end 2211. In addition, the second distance db is a distance in the axial direction from the start end 2211 to the positioning fixture 33 of the terminal fitting 30.

By setting the value obtained by dividing the second distance db by the first distance Da to 0.24 or more and 0.39 or less, similarly to the gas sensor 1, the gas sensor 1A can achieve the following advantageous effect. That is, the gas sensor 1A can achieve an advantageous effect of reducing a possibility of breakage of the terminal fitting 30 due to vibrations while avoiding the situation in which "the terminal fitting 30 is exposed to a high temperature and experiences metal deterioration or the like, whereby a contact failure occurs".

In addition, in the gas sensor 1A, the first distance Da is, for example, 51.6 mm or more. By setting the first distance Da to 51.6 mm or more, the gas sensor 1A ensures a sufficient distance from the heat source disposed in the gas sensor 1A on the front end side to the elastic body 50. Therefore, gas sensor 1A can achieve an advantageous effect of reducing the possibility that the elastic body 50 is exposed to a high temperature and undergoes erosion.

In the gas sensor 1A, the second distance db is, for example, 20.0 mm or less. By setting the second distance db to 20.0 mm or less, the gas sensor 1A ensures a sufficient distance from the heat source to the ceramic housing 60 and the terminal fitting 30. Therefore, the gas sensor 1A can achieve an advantageous effect of preventing the terminal fitting 30 from being exposed to a high temperature and becoming more susceptible to deterioration.

As illustrated in FIG. 2, in the gas sensor 1A, the lead wire holder 32 of the terminal fitting 30 may be disposed inside the spacer 90. By disposing the lead wire holder 32 inside the spacer 90, the gas sensor 1A can achieve an advantageous effect of preventing the lead wire holder 32 from interfering with the elastic body 50 or blocking the through hole of the elastic body 50.

[Features]

As described above, the gas sensors 1 and 1A according to the present embodiment are each a gas sensor capable of detecting a specific gas concentration of a gas to be measured. The gas sensor 1 (1A) includes the sensor element 10, the terminal fittings 30, the ceramic housing 60, the tubular body 20, the lead wires 40, and the elastic body 50.

The sensor element 10 extends in the axial direction (longitudinal direction), and includes a detection unit on the front end side and an element electrode on the rear end side. The terminal fitting 30 extends in the axial direction, and includes the element contact portion 31 electrically connected to the element electrode of the sensor element 10 on the front end side. In addition, the terminal fitting 30 includes the positioning fixture 33 that is locked to the ceramic housing 60 to fix the position of the terminal fitting 30 with respect to the ceramic housing 60. The ceramic housing 60 houses the element electrode of the sensor element 10 and the element contact portions 31 of the terminal fittings 30. The tubular body 20 is a cylindrical member that has an open end and in which the sensor element 10, the terminal fittings 30, and the ceramic housing 60 are disposed. The tubular body 20 includes, on the front end side, the protrusion 222 "that is in contact with an external member, to which the gas sensor is to be attached, and prevents leakage of the gas to be measured from a space (space to be measured) defined by the external member". The reduced diameter portion 221 is formed in the tubular body 20 on the rear end side. The reduced diameter portion 221 caulks the "portion of the elastic body 50 that accommodates the lead wires 40 therein and extends in the axial direction" from the periphery. Particularly, one or a plurality of the reduced diameter portions 221, that is, one or more reduced diameter portions 221, are formed in the tubular body 20 on the rear end side. The front end side of the lead wire 40 is crimped and fixed to the lead wire holder 32 formed in the terminal fitting 30 on the rear end side, and the rear end side of the lead wire 40 extends outward from the open end of the tubular body 20. The elastic body 50 is disposed so as to seal the open end of the tubular body 20, and the lead wires 40 are inserted into the elastic body 50.

In the gas sensor 1 (1A), the value obtained by dividing the second distance db by the first distance Da is 0.24 or more and 0.39 or less. The first distance Da is a distance in the axial direction from the start end 2211 of the reduced diameter portion 221 to the protrusion 222. For example, the first distance Da is a distance in the axial direction from the start end 2211 to a surface of the protrusion 222 (in the example illustrated in FIGS. 1 and 2, the end face of the protrusion 222 on the front end side) that is in contact with an external member (for example, an exhaust pipe) to which the gas sensor 1 (1A) is to be attached. The start end 2211 is an end of the reduced diameter portion 221 on the frontmost end side in the axial direction. In a case where a plurality of reduced diameter portions 221 are formed, the start end 2211 is an end on the frontmost end side of the reduced diameter portion 221 on the frontmost end side in the axial direction out of the plurality of reduced diameter portions 221. In addition, the second distance db is a distance in the axial direction from the start end 2211 to the positioning fixture 33 of the terminal fitting 30.

In this configuration, in the gas sensor 1 (1A), the positioning fixture 33 is locked to the ceramic housing 60, so that the terminal fitting 30 is fixed to the ceramic housing 60. In addition, in the gas sensor 1 (1A), the lead wire holder 32 of the terminal fitting 30 crimps and holds the lead wire 40, that is, the terminal fitting 30 is fixed to the lead wire 40. Furthermore, the reduced diameter portion 221 of the tubular body 20 caulks the periphery of the "portion of the elastic body 50 that accommodates the lead wires 40 therein and extends in the axial direction", so that the lead wires 40 are fixed. Therefore, the reduced diameter portion 221 of the tubular body 20 fixes the lead wires 40 and the terminal fittings 30 that crimp and hold the lead wires 40.

Here, the gas sensor 1 (1A) is, for example, used in a mode in which the front end side thereof is exposed to the inside of an exhaust pipe of an automobile in a state in which the front end side is fixed to the exhaust pipe. In such a state, vibrations of the exhaust pipe of the automobile are transmitted from the protrusion 222 of the tubular body 20 or the like. In other words, vibrations are applied to the gas sensor 1 (1A). At this time, the phase of the shake of the surface members (outer members) of the gas sensor 1 (1A) extending in the axial direction does not necessarily coincide with the phase of the shake of the inner members of the gas sensor 1 (1A) (members housed inside the gas sensor). For example, (1) the phase of the shake of the surface members such as the tubular body 20 does not necessarily coincide with (2) the phase of the shake of the inner members such as the sensor element 10 extending in the axial direction and the terminal fittings 30, which are electrically connected to the sensor element 10 and the positions of which are fixed inside the ceramic housing 60.

In addition, in a case where the phase of the shake of the tubular body 20 and the like and the phase of the shake of the sensor element 10 (and the terminal fittings 30) do not coincide with each other, a load is applied to the terminal fittings 30, so that there is a possibility that the terminal fittings 30 experience metal fatigue and break. As a portion of the terminal fitting 30 prone to experience metal fatigue, for example, the positioning fixture 33 is considered. The positioning fixture 33 is locked to the ceramic housing 60 to fix the position of the terminal fitting 30 with respect to the ceramic housing 60.

In general, the longer the first distance Da, the greater the shake of the surface members of the gas sensor 1 (1A) such as the tubular body 20. In addition, there is a higher possibility that a portion, of the terminal fitting 30 as a metal component, located between the start end 2211 of the reduced diameter portion 221 and the positioning fixture 33 of the terminal fitting 30 breaks due to the influence of this shake. As described above, in a case where a plurality of reduced diameter portions 221 that caulk the elastic body 50 from the periphery are formed, the start end 2211 is an end on the frontmost end side of the reduced diameter portion 221 on the frontmost end side in the axial direction out of the plurality of reduced diameter portions 221. As the shake that could cause breakage of the terminal fittings 30, the shake in parallel to the axial direction (longitudinal direction) of the gas sensor 1 (1A) is ignored.

In addition, in a case where the shake width (distance of the shake in a direction orthogonal to the axial direction) of the terminal fitting 30 can be regarded as constant, in general, the shorter the second distance db, the greater the angle of the shake of the terminal fitting 30. When the angle of the shake of the terminal fitting 30 increases, the load applied to the terminal fitting 30 also increases, so that there is a higher possibility that the terminal fitting 30 breaks. That is, when the second distance db is shortened, the angle of the shake of the terminal fitting 30 increases, whereby the terminal fitting 30 experiences metal fatigue, so that there is a higher possibility that the terminal fitting 30 breaks.

The inventors of the present invention have found that it is effective to set the second distance db to a sufficiently large value with respect to the first distance Da in order to reduce a possibility of breakage of the terminal fitting 30 due to vibrations applied to the gas sensor 1 (1A).

The inventors of the present invention have further conducted studies and a durability performance comparison test of the terminal fitting 30, and have confirmed the following phenomenon. That is, the inventors of the present invention have confirmed that the metal fatigue of the terminal fitting 30 due to vibrations applied to the gas sensor 1 (1A) can be reduced by setting the value obtained by dividing the second distance db by the first distance Da to 0.24 or more.

Here, when the value obtained by dividing the second distance db by the first distance Da increases, the positioning fixture 33 of the terminal fitting 30 is brought closer to the front end side of the sensor element 10. In other words, the terminal fitting 30 is brought closer to the heat source disposed in the gas sensor 1 (1A) on the front end side. Therefore, when the value obtained by dividing the second distance db by the first distance Da increases, there is a concern that the terminal fitting 30 electrically connecting the sensor element 10 and the lead wire 40 to each other is exposed to a high temperature and experiences metal deterioration or the like, whereby a contact failure occurs. In view of the above, in order to ensure a sufficient distance from the heat source to the terminal fitting 30, the value obtained by dividing the second distance db by the first distance Da is set to be small, specifically, "0.39" or less. By setting the value obtained by dividing the second distance db by the first distance Da to 0.39 or less, it becomes possible to avoid a situation in which "the terminal fitting 30 is exposed to a high temperature and experiences metal deterioration or the like, whereby a contact failure occurs".

Therefore, by setting the value obtained by dividing the second distance db by the first distance Da to 0.24 or more and 0.39 or less, the gas sensor 1 (1A) can achieve the following advantageous effect. That is, the gas sensor 1 (1A) can achieve an advantageous effect of reducing a possibility of breakage of the terminal fitting 30 due to vibrations while avoiding the situation in which "the terminal fitting 30 is exposed to a high temperature and experiences metal deterioration or the like, whereby a contact failure occurs".

Modification

Although the embodiment of the present invention has been described above, the above description of the embodiment is merely an example of the present invention in all respects. Various improvements and modifications may be made to the above embodiment. With respect to each constituent element of the above embodiment, omission, replacement, and addition of the constituent element may be appropriately made. In addition, the shape and dimension of each constituent element of the above embodiment may be appropriately modified according to the embodiment. For example, the following modifications are possible. Note that, in the following description, the same reference numerals are used for the same constituent elements as those of the above embodiment, and the description of the same points as those of the above embodiment is appropriately omitted. The following modifications can be appropriately combined.

(Front End Face of Spacer)

FIG. 2 illustrates an example of the spacer 90 in which an end face on the front end side (front face) in the axial direction is flat. However, the front end face of the spacer 90 is not necessarily flat in the gas sensor according to the present invention. The spacer 90 that is in contact with the ceramic housing 60 (particularly, the end face of the ceramic housing 60 on the rear end side (rear end face)) on the front end face may be in contact with the ceramic housing 60 at only a portion of the front end face. For example, one or a plurality of recesses may be formed on the front end face of the spacer 90, and the front end face of the spacer 90 and the ceramic housing 60 (particularly, the rear end face of the ceramic housing 60) may be in contact with each other at a portion excluding the one or the plurality of recesses. Alternatively, one or a plurality of protrusions may be formed on the front end face of the spacer 90, and the front end face of the spacer 90 and the ceramic housing 60 may be in contact with each other only at apexes of the one or the plurality of protrusions (in a case where a plurality of protrusions are formed, respective apexes of the plurality of protrusions).

The gas sensor according to the present invention can achieve the following advantageous effects by bringing the spacer 90 into contact with the ceramic housing 60 (particularly, the rear end face of the ceramic housing 60) only at a portion of the front end face, rather than the entire front end face of the spacer 90. That is, the gas sensor according to the present invention can achieve an advantageous effect of reducing heat transfer from the ceramic housing 60 to the spacer 90, and further to the elastic body 50. For example, in order to prevent the elastic body 50 from experiencing deterioration due to heat while securing the strength of the spacer 90, the gas sensor according to the present invention may be formed with at least one of one or a plurality of recesses and protrusions on the front end face of the spacer 90. The spacer 90 in which at least one of one or a plurality of recesses and protrusions are formed on the front end face is in contact with the ceramic housing 60 (particularly, the rear end face of the ceramic housing 60) not at the entire front end face but at a portion of the front end face.

(The Number of Reduced Diameter Portions)

The number of reduced diameter portions 221 formed in the tubular body 20 may be "one" or "plural". In the gas sensor according to the present invention, the number of reduced diameter portions 221 formed in the tubular body 20 is appropriately determined on the basis of the length of the gas sensor in the axial direction (longitudinal direction), the length of the elastic body 50 in the axial direction, a use environment, use conditions, and the like of the gas sensor.

EXAMPLES

In order to verify the advantageous effects (particularly, durability performance of the terminal fitting) of the present invention, the inventors of the present invention fabricated gas sensors according to Examples 1 to 8 below and conducted a highly accelerated limit test (HALT test). However, the present invention is not limited to the following examples (standards).

TABLE 1

| | Ex-ample 1 | Ex-ample 2 | Ex-ample 3 | Ex-ample 4 | Ex-ample 5 | Ex-ample 6 | Ex-ample 7 | Ex-ample 8 |
|---|---|---|---|---|---|---|---|---|
| Db/Da | 0.12 | 0.16 | 0.18 | 0.21 | 0.24 | 0.29 | 0.32 | 0.37 |
| Evaluation | X | X | X | Δ | O | O | O | O |

In Table 1, Examples 1 to 8 are gas sensors each including the configuration (member) illustrated in FIG. 1. However, values, each of which is obtained by dividing the second distance db, which is a "distance in the axial direction from the start end that is an end of the reduced diameter portion on the frontmost end side to the positioning fixture of the terminal fitting", by the first distance Da, which is a "distance in the axial direction from the start end to the protrusion", are different from each other in Examples 1 to 8.

Note that any or all of Examples 1 to 8 may be a gas sensor including the configuration (member) illustrated in FIG. 2. In other words, any or all of Examples 1 to 8 may include the spacer 90 illustrated in FIG. 2. For example, Examples 5 to 8 may each be a gas sensor including the spacer 90 illustrated in FIG. 2, and Examples 1 to 4 may each be a gas sensor including the configuration illustrated in FIG. 1. That is, it is sufficient that the values obtained by dividing the second distance db by the first distance Da in Examples 1 to 8 are the values indicated in Table 1. Which one of the configuration (member) illustrated in FIG. 1 and the configuration (member) illustrated in FIG. 2 is provided did not affect the test result ("evaluation" in Table 1).

Examples 1 to 3 are gas sensors in each of which the value obtained by dividing the second distance db by the first distance Da (db/Da) is extremely smaller than "0.24". Example 4 is a gas sensor in which the value obtained by dividing the second distance db by the first distance Da (db/Da) is slightly smaller than "0.24". Examples 5 to 8 are gas sensors in each of which the value obtained by dividing the second distance db by the first distance Da (db/Da) falls in a range of "0.24" or more.

The inventors of the present invention conducted the following HALT test on the gas sensors according to the respective Examples 1 to 8 described above in order to compare durability performances of the terminal fittings 30. That is, the HALT test, in which temperature and acceleration conditions were varied in the sequence illustrated in FIG. 3, was conducted on the gas sensors according to the respective Examples 1 to 8 (particularly, a plurality of gas sensors according to the respective examples).

Figure 3:
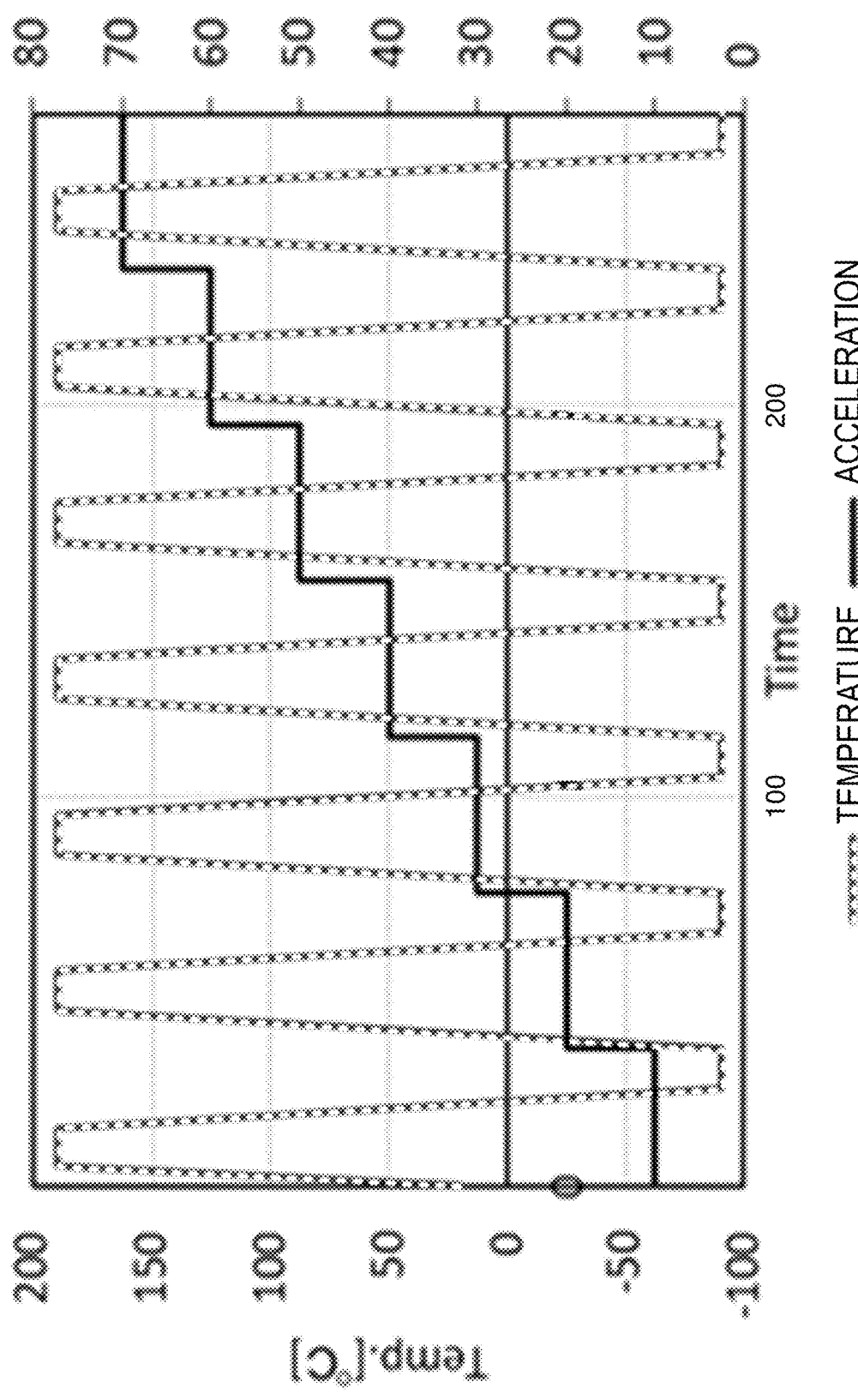
FIG. 3 is a graph illustrating changes in temperature and acceleration in a durability performance comparison test.
Figure 4:
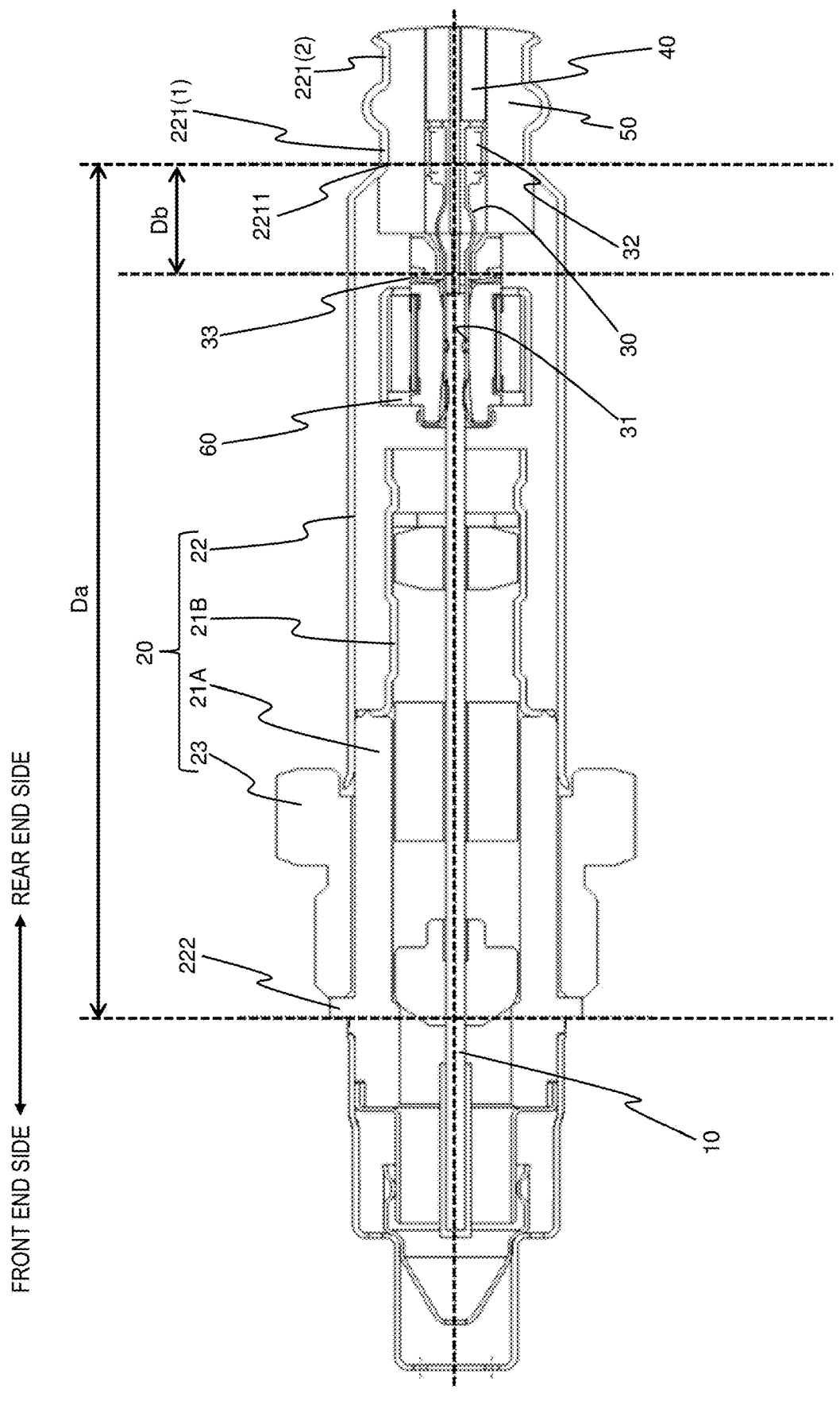
FIG. 4 is a schematic cross-sectional view schematically illustrating a configuration example of a conventional gas sensor.

FIG. 3 is a graph illustrating respective changes (sequences) in the temperature and acceleration conditions in the HALT test (durability performance comparison test) conducted on the gas sensors according to the respective Examples 1 to 8 by the inventors of the present invention. In the graph illustrated in FIG. 3, the change in the temperature condition is indicated by a dotted line, and as illustrated in FIG. 3, the temperature condition is changed in a range of from "−90° C." to "190° C.". In addition, in the graph illustrated in FIG. 3, the change in the acceleration condition is indicated by a solid line, and as illustrated in FIG. 3, the acceleration condition is changed in a range of from "10 Grms" to "70 Grms".

The HALT test was conducted on a plurality of gas sensors according to the respective examples, and after the HALT test was conducted (for example, at time point=200, in other words, at acceleration=40 Grms), whether or not there was breakage in the terminal fittings 30 (particularly, the positioning fixtures 33) was confirmed. That is, the HALT test described above was conducted on the plurality of gas sensors according to Example 1, and after the HALT test was conducted, whether or not there was breakage was confirmed for each of the terminal fittings 30 (particularly, the positioning fixtures 33) of the plurality of gas sensors. Similarly, the HALT test described above was conducted on the plurality of gas sensors according to the respective Examples 2 to 8, and after the HALT test was conducted, whether or not there was breakage was confirmed for each of the positioning fixtures 33 of the plurality of gas sensors according to the respective examples.

In Table 1, the evaluation "○ (excellent)" indicates that there was no breakage in the terminal fittings 30 (particu- larly, the positioning fixtures 33) for all of the plurality of gas sensors in the corresponding example. The evaluation "□(standard)" indicates that breakage was confirmed in the terminal fittings 30 (particularly, the positioning fixtures 33) for some gas sensors of the plurality of gas sensors in the corresponding example. The evaluation "×(poor)" indicates that breakage was confirmed in the terminal fittings 30 (particularly, the positioning fixtures 33) for all of the plurality of gas sensors in the corresponding example.

The gas sensors according to Examples 1 to 3, in each of which the value obtained by dividing the second distance db by the first distance Da (db/Da) is extremely smaller than "0.24", were all evaluated as "×(poor)". In addition, the gas sensors according to Example 4, in which the value obtained by dividing the second distance db by the first distance Da (db/Da) is "0.21", which is slightly smaller than "0.24", were evaluated as "Δ (standard)". In contrast, the gas sensors according to Examples 5 to 8, in each of which the value obtained by dividing the second distance db by the first distance Da (db/Da) falls in a range of "0.24" or more, were each evaluated as "○ (excellent)". Therefore, it was con- firmed that the "possibility of breakage of the terminal fitting 30 due to vibrations applied to the gas sensor" can be reduced very well by setting the value obtained by dividing the second distance db by the first distance Da to 0.24 or more.

Furthermore, as described above, the first distance Da is desirably set to 51.6 mm or more, and the second distance db is desirably set to 20.0 mm or less. Therefore, the value obtained by dividing the second distance db by the first distance Da (db/Da) is desirably set to "0.39" or less. When the value obtained by dividing the second distance db by the first distance Da increases, the positioning fixture 33 of the terminal fitting 30 is brought closer to the front end side of the sensor element 10. In other words, the terminal fitting 30 is brought closer to the heat source disposed in the gas sensor on the front end side. Therefore, when the value obtained by dividing the second distance db by the first distance Da increases, there is a concern that the terminal fitting 30 electrically connecting the sensor element 10 and the lead wire 40 to each other is exposed to a high tempera- ture and experiences metal deterioration or the like, whereby a contact failure occurs. In view of the above, in order to ensure a sufficient distance from the heat source to the terminal fitting 30, the value obtained by dividing the second distance db by the first distance Da is set to be small, specifically, "0.39" or less. By setting the value obtained by dividing the second distance db by the first distance Da to 0.39 or less, it becomes possible to avoid the situation in which "the terminal fitting 30 is exposed to a high tempera- ture and experiences metal deterioration or the like, whereby a contact failure occurs".

Therefore, by setting the value obtained by dividing the second distance db by the first distance Da to 0.24 or more and 0.39 or less, the gas sensor including the configuration (member) illustrated in FIG. 1 (or the gas sensor further including the spacer 90 illustrated in FIG. 2) can achieve the following advantageous effect. That is, the gas sensor including the above-described configuration can achieve advantageous effects of reducing the "possibility of break- age of the terminal fitting 30 due to vibrations applied to the gas sensor", and avoiding the situation in which "the terminal fitting 30 is exposed to a high temperature and experi- ences metal deterioration or the like, whereby a contact failure occurs".

REFERENCE SIGNS LIST

1, 1(A) Gas sensor
10 Sensor element
20 Tubular body
221 Reduced diameter portion
222 Protrusion
2211 Start end
30 Terminal fitting
31 Element contact portion
32 Lead wire holder
33 Positioning fixture
40 Lead wire
50 Elastic body
60 Ceramic housing
90 Spacer

The invention claimed is:

1. A gas sensor capable of detecting a specific gas concentration of a gas to be measured, the gas sensor comprising:
   a sensor element that extends in an axial direction and includes a detection unit on a front end side and an element electrode on a rear end side;
   a terminal fitting that extends in the axial direction and includes an element contact portion electrically con- nected to the element electrode on the front end side;
   a ceramic housing that houses the element electrode and the element contact portion;
   a tubular body that has an open end and in which the sensor element, the terminal fitting, and the ceramic housing are disposed;
   a lead wire, the front side of which is crimped and fixed to a lead wire holder formed in the terminal fitting on the rear end side, and the rear end side of which extends outward from the open end; and
   an elastic body that is disposed so as to seal the open end and into which the lead wire is inserted,
   wherein the terminal fitting includes a positioning fixture that is locked to the ceramic housing to fix a position of the terminal fitting with respect to the ceramic housing,
   the tubular body includes, on the front end side, a pro- trusion that is in contact with an external member, to which the gas sensor is to be attached, and prevents leakage of the gas to be measured from a space defined by the external member,
   a reduced diameter portion that caulks a portion of the elastic body that accommodates the lead wire therein and extends in the axial direction from a periphery is formed in the tubular body on the rear end side, and
   a value obtained by dividing (2) a second distance Db that is a distance in the axial direction from a start end that is an end of the reduced diameter portion on a frontmost end side to the positioning fixture by (1) a first distance Da that is a distance in the axial direction from the start end to the protrusion is 0.24 or more and 0.39 or less.

2. The gas sensor according to claim 1, wherein the first distance Da is 51.6 mm or more.

3. The gas sensor according to claim 1, wherein the second distance Db is 20.0 mm or less.

4. The gas sensor according to claim 1, further comprising a spacer disposed between the ceramic housing and the elastic body in the axial direction.

5. The gas sensor according to claim 2, wherein the second distance Db is 20.0 mm or less.

6. The gas sensor according to claim 2, further comprising a spacer disposed between the ceramic housing and the elastic body in the axial direction.

\* \* \* \* \*